United States Patent [19]
Fukuyama et al.

[11] Patent Number: 5,172,283
[45] Date of Patent: Dec. 15, 1992

[54] MODE CHANGING SLIDER PLATE MECHANISM FOR TAPE RECORDING AND/OR REPRODUCING APPARATUS

[75] Inventors: Yutaka Fukuyama, Tokyo; Yoshinori Yamamoto; Tatsuya Mototake, both of Kanagawa; Yuji Sudoh, Tochigi, all of Japan

[73] Assignee: Sony Corporation, Tokyo, Japan

[21] Appl. No.: 533,872

[22] Filed: Jun. 6, 1990

[30] Foreign Application Priority Data

Jun. 21, 1989 [JP] Japan .................................. 1-160524

[51] Int. Cl.⁵ .............................................. G11B 5/027
[52] U.S. Cl. ........................................ 360/85; 360/137
[58] Field of Search ............................. 360/137, 85, 95

[56] References Cited

U.S. PATENT DOCUMENTS 4,841,391 6/1989 Iwasaki ........................... 360/137 X
4,907,110 3/1990 Ando ................................ 360/95 X Primary Examiner—A. J. Heinz
Attorney, Agent, or Firm—Philip M. Shaw, Jr.

[57] ABSTRACT

To enable simple and accurate positional adjustment of the various tape loading and driving elements of a cassette tape recorder and/or reproducer, a single mode changing slider controls respective displacements of movable members of a reel base driving mechanism, a pinch-roller transferring mechanism, a brake operating mechanism, a back-tension exerting mechanism, a tape loading mechanism and so forth, which displacements are required whenever an optional mode of the apparatus is selected.

25 Claims, 14 Drawing Sheets

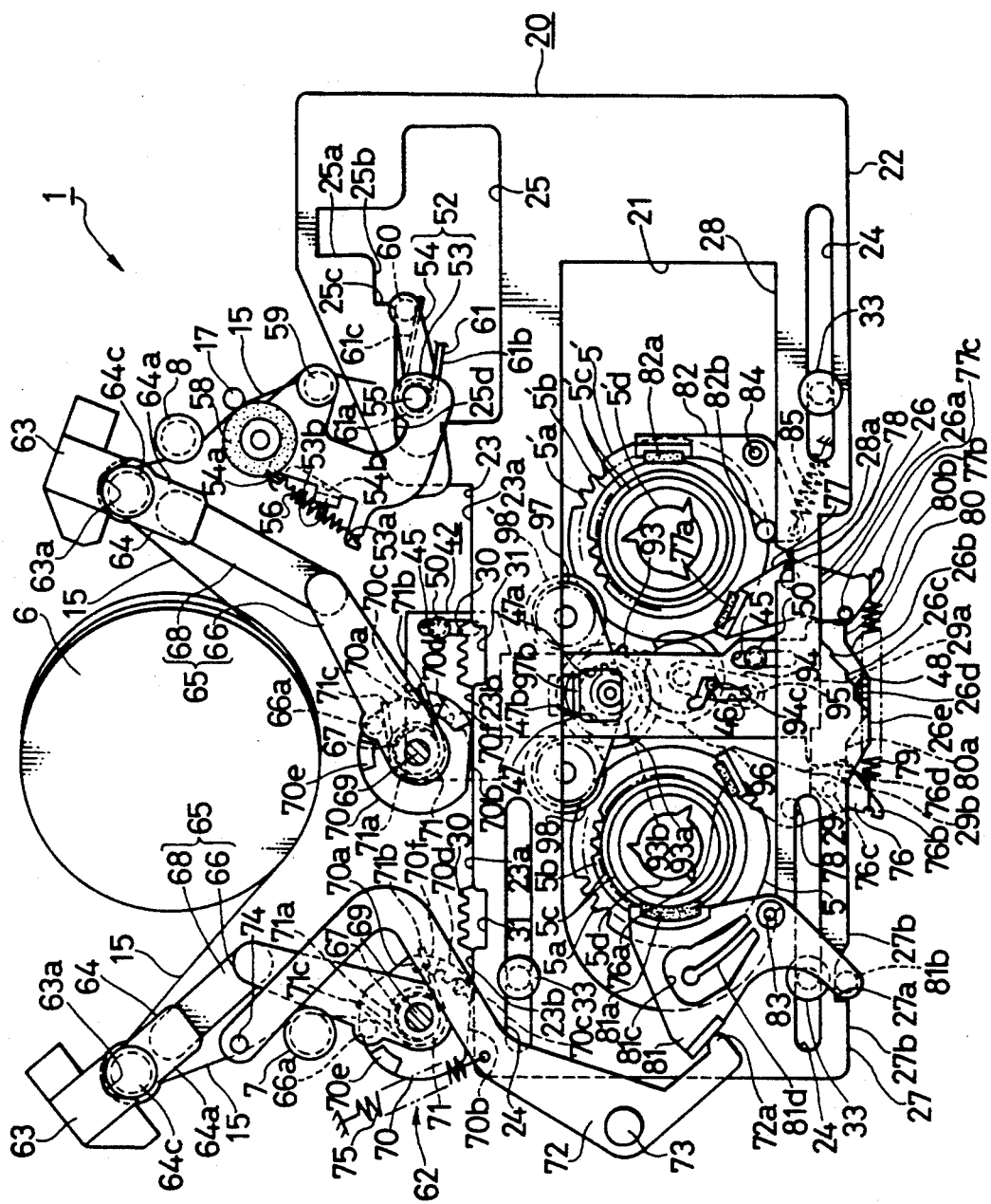
FIG. IC

MODE CHANGING SLIDER PLATE MECHANISM FOR TAPE RECORDING AND/OR REPRODUCING APPARATUS

BACKGROUND OF THE INVENTION

1. Field of the Invention

This invention relates to a mode changing mechanism for tape recording and/or reproducing apparatus, and particularly, but not exclusively, to a mode changing mechanism for a rotary-head-type digital audio tape player (R-DAT), or a video tape recorder (VTR), which has a tape loading device by which a tape is drawn out from a mounted tape cassette so as to enable the tape to run along a predetermined tape running path.

2. Description of the Prior Art

Generally, an apparatus, such as an R-DAT or a VTR, is equipped with a reel base driving member for selectively driving either of a pair of reel bases, a pinch-roller transferring member for transferring a pinch-roller to a selected one of a plurality of predetermined positions, a brake operating member which is operated to selectively arrest one or both of the reel bases, a back-tension exerting member for selectively exerting a back tension on one of the reel bases, a tape loading member for selectively loading or unloading a tape, etc., and an optional mode can be selected from among various kinds of modes, if the respective members are brought into pertinent positions thereof.

Such members usually are divided into several groups, and driven by a single motor and a plurality of drive mechanisms to connect the motor to the respective members in every group. However, even among the members belonging to the same group, there are generally certain differences in timings for moving the respective members, strokes or moving directions of the respective members, or the like, so that it is necessary to interpose cam means and speed changing means between the motor and each of the drive mechanisms, and further, to provide detecting means for detecting the positions of the respective members and the moved elements of the respective drive mechanisms. As a result, the apparatus becomes complicated in structure, the manufacturing cost rises, and it is difficult to miniaturize the apparatus.

Moreover, it becomes necessary to assemble the apparatus so that there is no phase shift between the drive mechanism and the members which have a closer relation with tape running, and such painstaking assembly requires much time. If there is a phase shift between the drive mechanism and the tape handling members, for example, the tape handling members do not correctly come to their predetermined pertinent positions when the apparatus is operated so as to select an optional mode, so that the apparatus will not be put in action.

SUMMARY OF THE INVENTION

Accordingly, it is an object of the present invention to provide a tape recording and/or reproducing apparatus in which a sliding member with cams and racks is provided, and when the sliding member is driven, a tape loading member, a pinch-roller transferring member, a brake operating member, a reel base driving member, and others, which have been engaged with the sliding member through the cam or the rack, respectively, are moved to respective predetermined positions, which correspond to a selected mode.

In accordance with an aspect of this invention, a mode changing mechanism is provided for a tape cassette recording and/or reproducing apparatus of the type including rotary head drum means for recording information on and/or reproducing information from a magnetic tape, a capstan for driving the tape past the rotary head drum means, pinch-roller transferring means, including a rotatably supported pinch-roller, for pressing the pinch-roller against the capstan, a pair of reel bases capable of being engaged with a pair of tape reels which are accommodated in a tape cassette loaded into the tape cassette recorder and/or reproducing apparatus, and on which the magnetic tape is wound, tape loading means for drawing out the magnetic tape from the tape cassette and leading the tape to a predetermined tape path including the periphery of the rotary head drum means, a tape reel drive motor, reel base driving means for selectively imparting torque from the tape reel drive motor to either of the pair of reel bases, control means for controlling the action of the reel base driving means, and brake operating means for braking the pair of reel bases under predetermined conditions. The mode changing mechanism comprises mode changing means, including a mode changing slider moveable in parallel with a line passing through the centers of the pair of reel bases, integral first regulatory drive means for driving the tape loading means under a first set of predetermined conditions, second regulatory drive means for driving the pinch-roller transferring means under a second set of predetermined conditions, third regulatory drive means for driving the control means under a third set of predetermined conditions, and fourth regulatory drive means for driving the brake operating means under a fourth set of predetermined conditions. The mode changing mechanism further comprises slider driving means for driving the mode changing slider in accordance with a selected one of a plurality of modes, each mode corresponding to a different combination of the first to fourth sets of predetermined conditions.

The mode changing slider is moved in parallel with a line passing through the centers of the pair of reel bases so as to be located in a first mode position where at least the tape cassette can be ejected, in a second mode position where tape loading is completed with the help of the tape loading means, in a third position where a fast forward/rewind (FF/REW) mode is established, in a fourth position where a forward-playback/record (FWD-PB/REC) mode is established, and in a fifth position where a reverse-playback (REV-PB) mode is established.

The tape loading means comprises a chassis and the reel base driving means comprises a plurality of gears and a swingable arm which rotatably supports a first gear of the plurality of gears to enable it to be selectively engaqed with either one of the reel bases so as to impart a torque thereto in a forward/reverse (FWD/REV) mode, and a swingable lever which rotatably supports a plurality of the gears to enable a different one of them to be selectively engaged with a different one of the reel bases so as to impart the torque thereto in a fast forward/rewind (FF/REW) mode.

The reel base driving means includes an auxiliary slider movable to a first mode through fifth mode positions in a direction perpendicular to the movement of the mode changing slider so as to locate the swingable arm in a FWD position, in a neutral position, or in a REV position, and locate the swingable lever in a locking position or in a releasing position. The swingable arm used for establishing the FWD/REV mode is held in a neutral position, with first gear unengaged with either of the reel bases, while the auxiliary slider is moved from the first mode position to the third mode position through the second mode position; moved to a position for establishing the FWD mode when the auxiliary slider is moved from the third mode position to the fourth mode position; and moved to a position for establishing the REV mode when the auxiliary slider is moved from the fourth mode position to the fifth mode position.

The above and other objects, features and advantages of this invention, will be apparent from the following detailed description of an illustrative embodiment thereof to be read in connection with the accompanying drawings, wherein like reference numerals identify the same or corresponding parts in the several views.

BRIEF DESCRIPTION OF THE DRAWINGS

FIGS. 1A to 1D are a chain of diagrammatic plan views, omitting certain structural portions, e.g. the chassis for purposes of clarity, and which illustrate the results of a series of mode changes, performed in order, of a rotary-head-type digital audio tape player (R-DAT) according to an embodiment of this invention;

DETAILED DESCRIPTION OF A PREFERRED EMBODIMENT

Figure 1A:
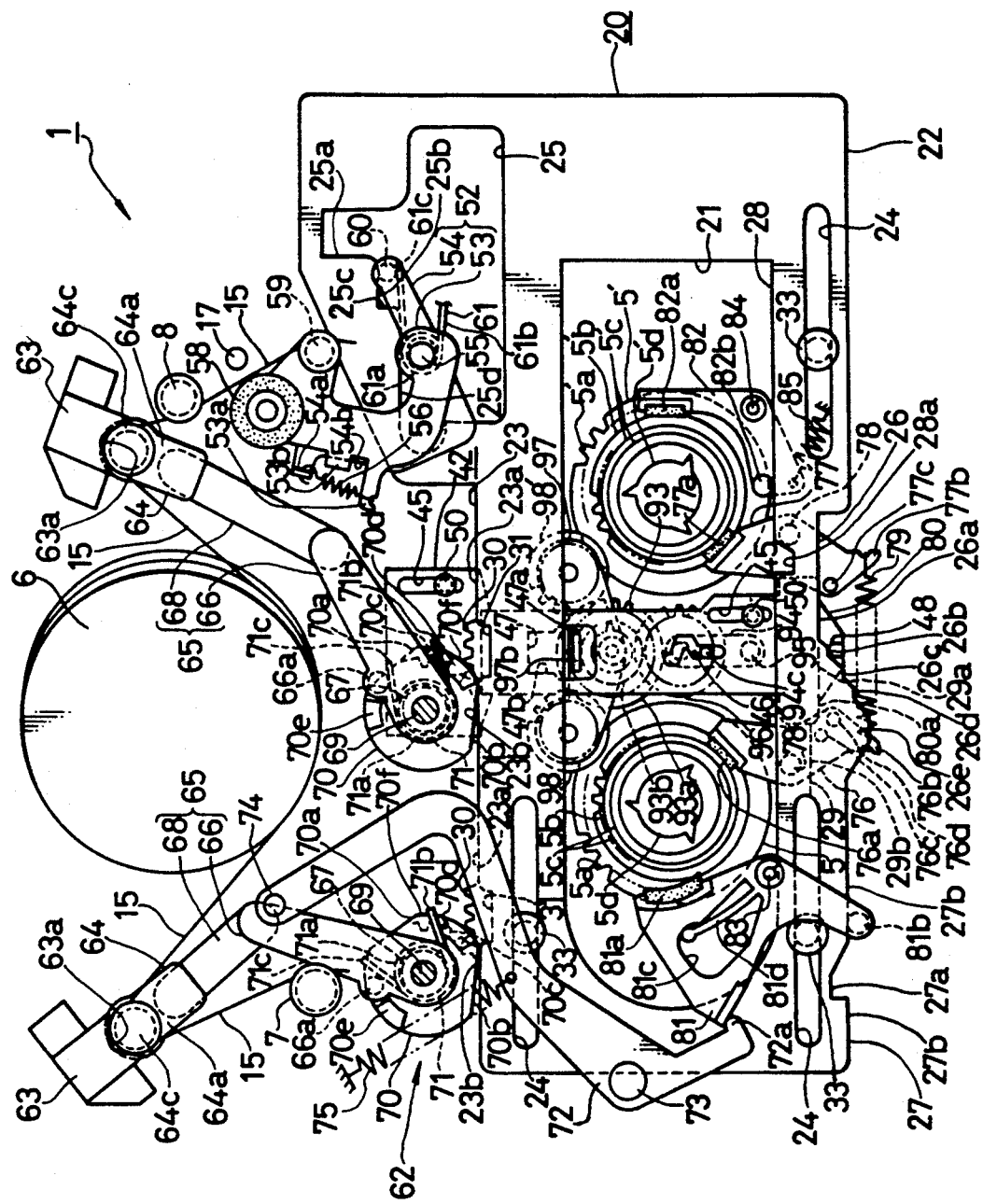

Referring to the accompanying drawings which illustrate a digital audio tape player (R-DAT) embodying this invention, and initially to FIG. 4 thereof, a chassis 2 and an auxiliary chassis 3 positioned below the chassis 2 are parallel to each other, and one end of the chassis 2 is vertically flush with one end of the auxiliary chassis 3, as viewed in the figure. A pair of spindles 4 vertically project from the auxiliary chassis 3 (FIG. 7) through the chassis 2, and are loosely fitted, respectively into a supply reel base 5 and a take-up reel base 5′.

Each reel base 5, 5′ has, respectively, a large driven gear 5a, 5′a used when recording or reproducing, a small driven gear 5b, 5′b used when the reel base 5, 5′ is rotated at high speed, a brake drum 5c, 5′c and a reel engaging shaft 5d, 5′d. As shown in FIG. 4, the upper portion of the reel base 5, 5′ that is substantially higher than the middle portion of the brake drum 5c, 5′c protrudes from an opening 2a which is provided in the chassis 2.

A head drum 6 arranged on the upper side of the chassis 2 comprises a lower drum 6a fixed to the chassis 2, an upper drum 6b rotatably supported by the lower drum 6, and a rotary magnetic head 6c which projects a little from a slit formed between the upper drum 6b and the lower drum 6a, and can rotate together with the upper drum 6b. Reference numerals 7 and 8 denote stationary tape guides that are fixed to the chassis 2, and reference numeral 9 denote pins projecting from the upper surface of the chassis 2 for positioning a tape cassette 10 when the tape cassette is mounted on the player.

Figure 10:
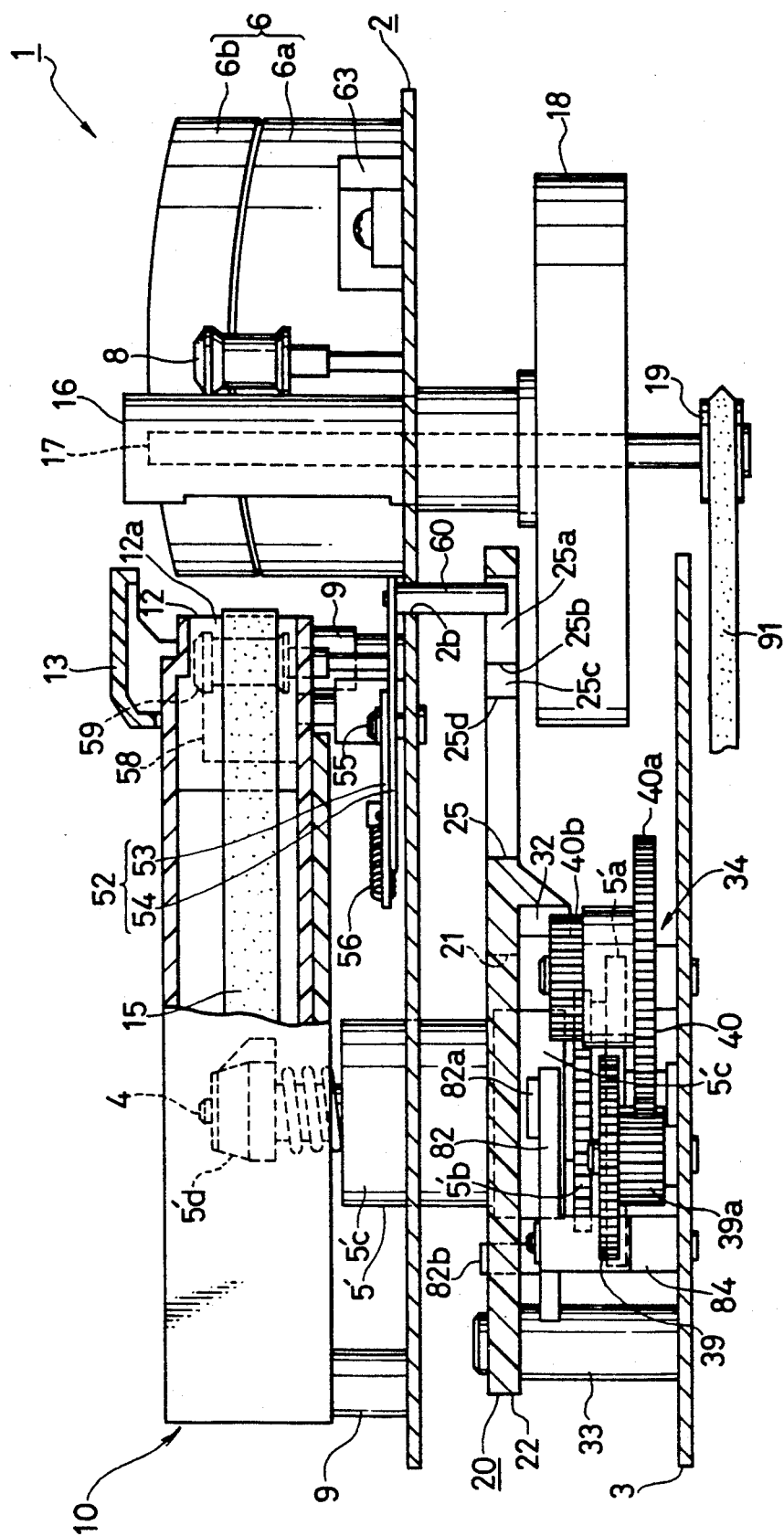
FIG. 10 is a sectional view taken along the line X—X on FIG. 2, with portions broken away.
Figure 11:
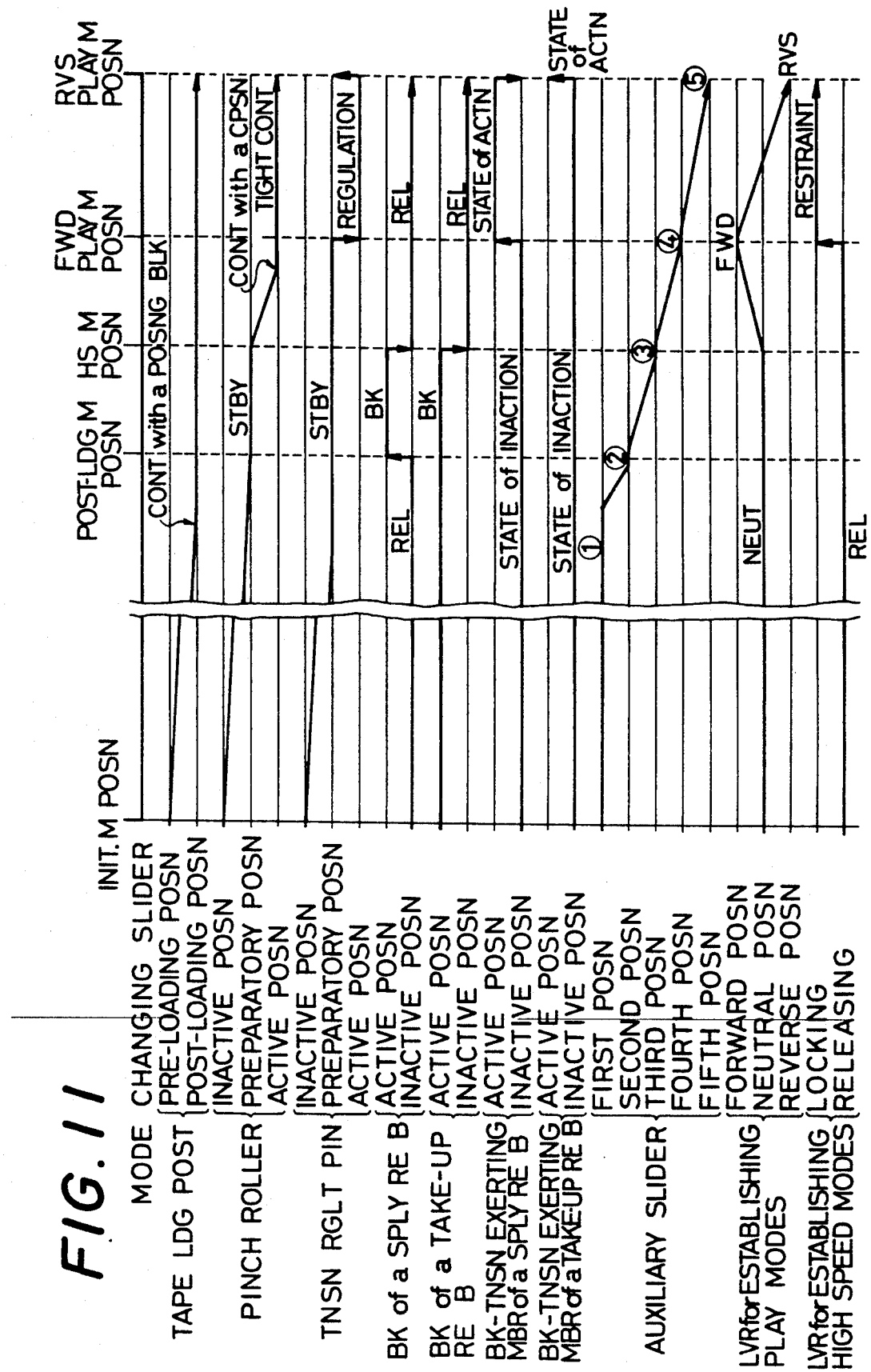
FIG. 11 is a graphical representation of the timing of the various members' positional relationships present in the player of FIG. 1.

A capstan 17 protruding from the chassis 2 is protected by, and rotatably supported, at the top thereof, by a capstan housing 16 which is fixed to the chassis 2. The capstan housing 16 has an opening 16a. As shown in FIG. 10, the capstan housing 16 extends downwards through the chassis 2. The case of a capstan motor 18 is fixed to the bottom of the housing 16. The capstan 17 is driven by the capstan motor 18. A driving pulley 19 is secured to the lower end of the capstan 17.

Figure 2:
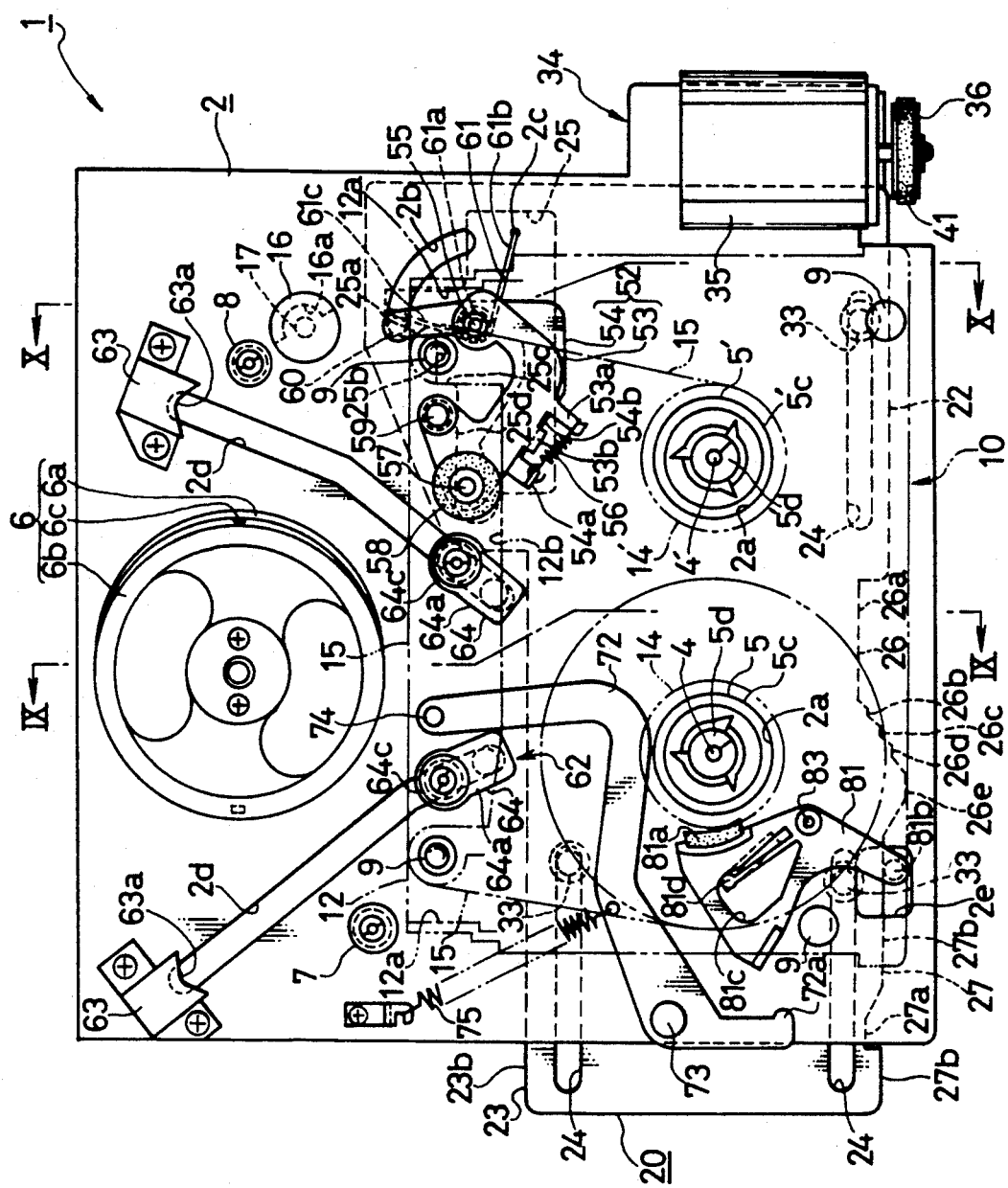
FIG. 2 is a complete plan view of the player of FIGS. 1A to 1D at the time of an initial mode.

As indicated by two-dots-and-dash lines in FIG. 2, and as shown in FIG. 10, the tape cassette 10 has a lid 13 at a front side 12 thereof, which faces the head drum 6 when the tape cassette 10 is mounted on the player. At each end of the front side 12 of the tape cassette 10, there are openings 12a to draw out a magnetic tape 15. Between the two openings 12a, there is a recess 12b (FIG. 2). Before the tape cassette 10 is mounted on the player, a part of the tape 15 that is outside of the tape cassette 10 is in a state of being stretched along the front side 12 of the tape cassette 10. Within the tape cassette 10, the tape 15 is in a state of being wound around a pair of tape reels 14 and 14′ (FIG. 2). Part of the tape 15 and the front side 12 of the tape cassette 10 are covered with the lid 13.

A mode changing slider 20

Figure 3:
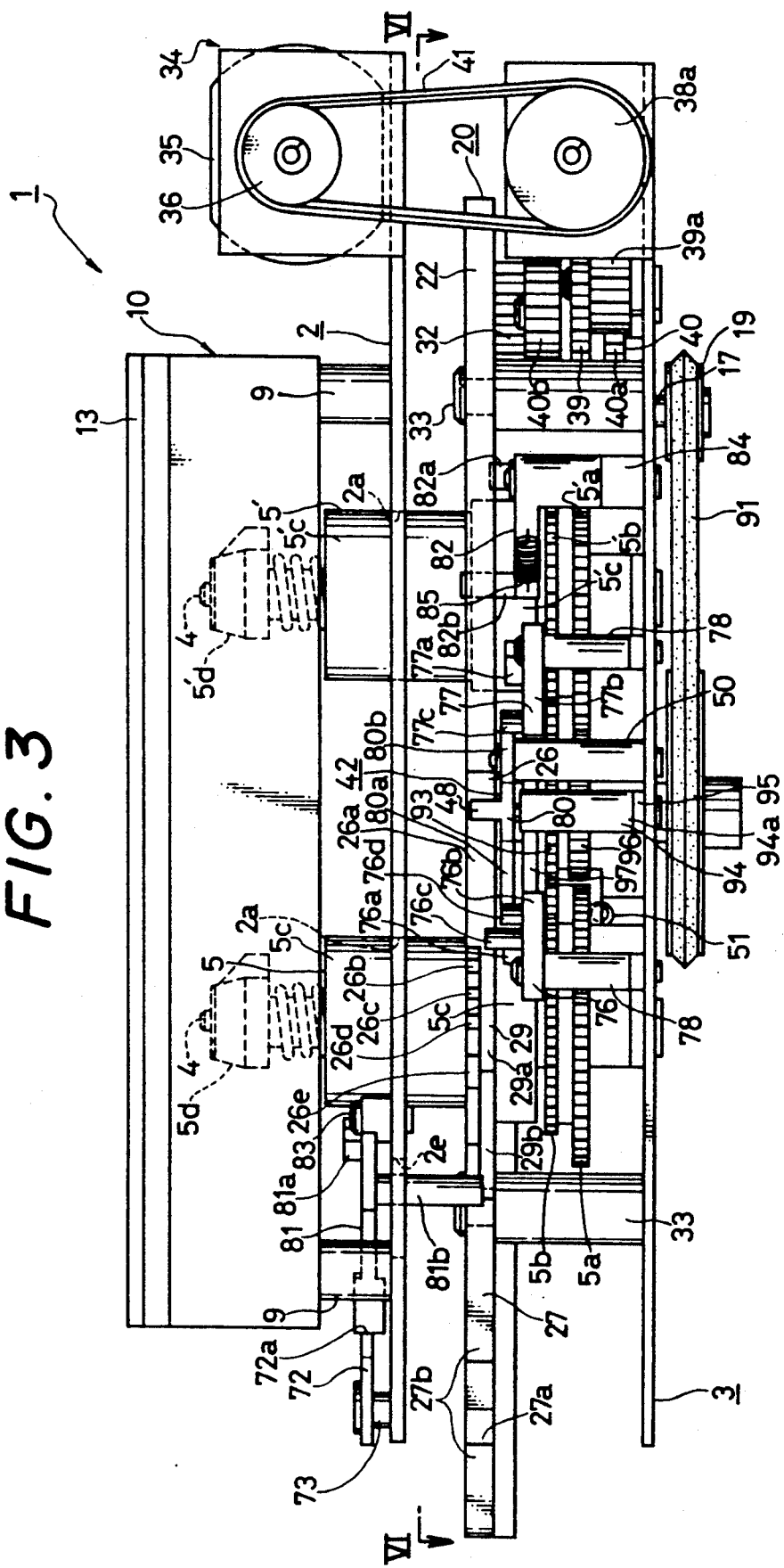
FIG. 3 is a front elevation of the player of FIG. 2, with a tape cassette being mounted therein.
Figure 8:
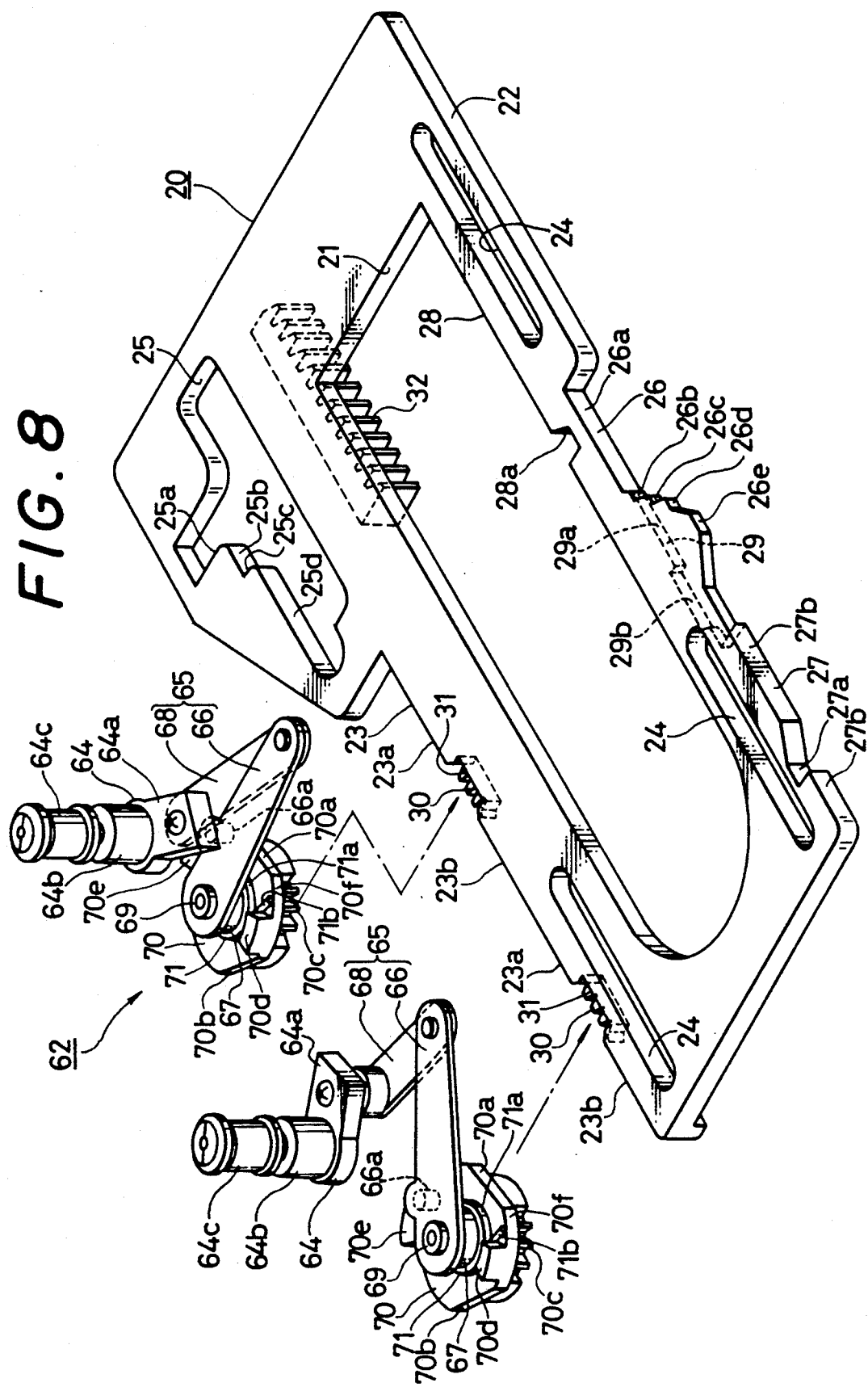
FIG. 8 is an exploded, perspective view of a tape loading device and a mode changing slider incorporated in the player of FIG. 2.

The mode changing slider 20 is constituted of substantially a rectangular frame, as shown in FIG. 8, and made of synthetic resin. Three slots 24 are provided at three corners of the frame. The slider 20 is slidably supported by three, grooved, guide pins 33 which project from the auxiliary chassis 3, as shown in FIG. 3, and are fitted into the respective slots 24.

Figure 5:
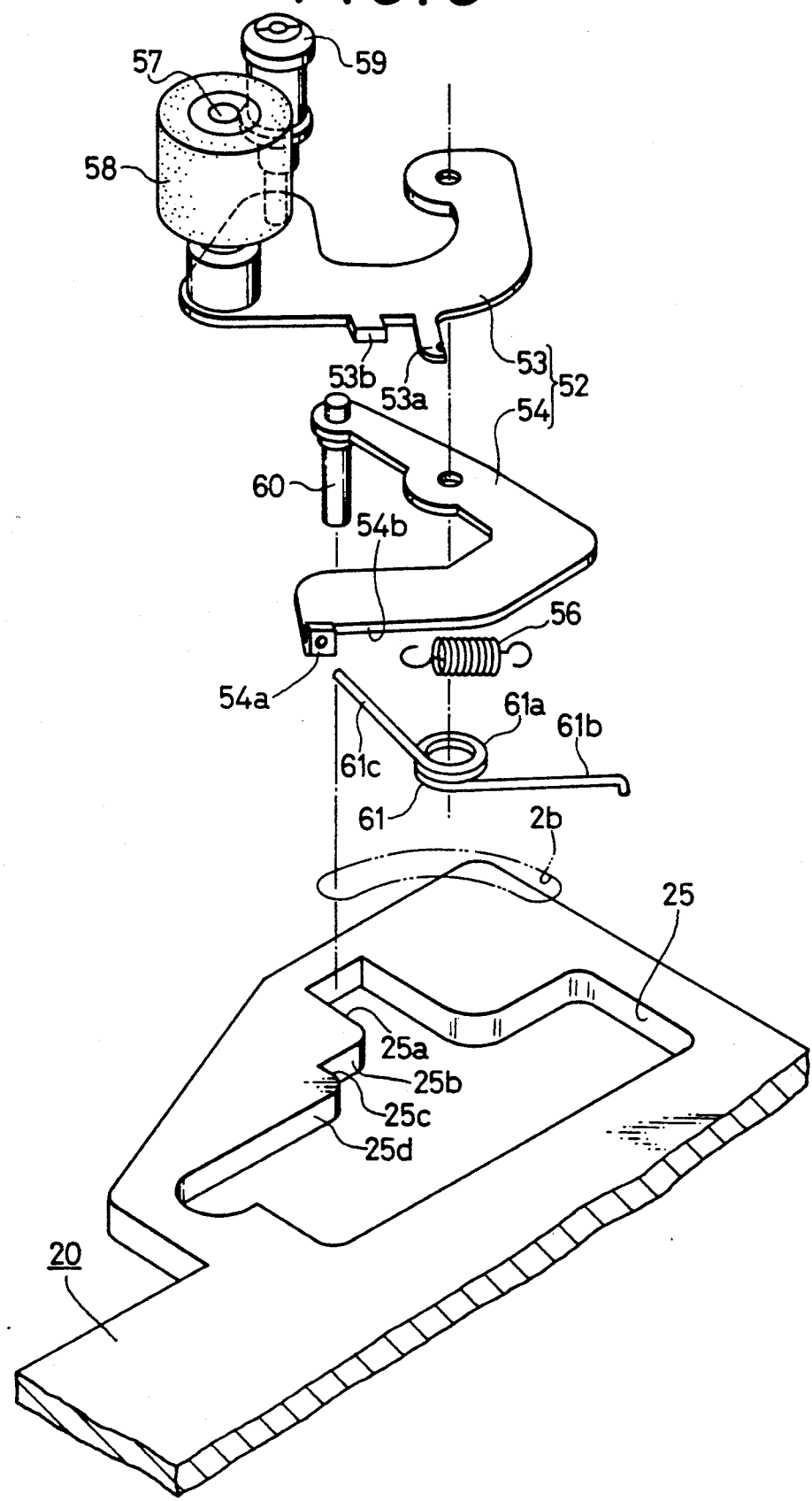
FIG. 5 is an exploded, perspective view with portions broken away and in section, of a pinch-roller device incorporated in the player of FIG. 2.

As best shown in FIGS. 5 and 8, an opening 25 is provided in the corner of the slider 20 which does not have a slot 24. The side faces of the opening 25 partially form cam faces 25a to 25d, which are followed by a cam follower 60, to control the motion of a pinch-roller 58.

Figure 6:
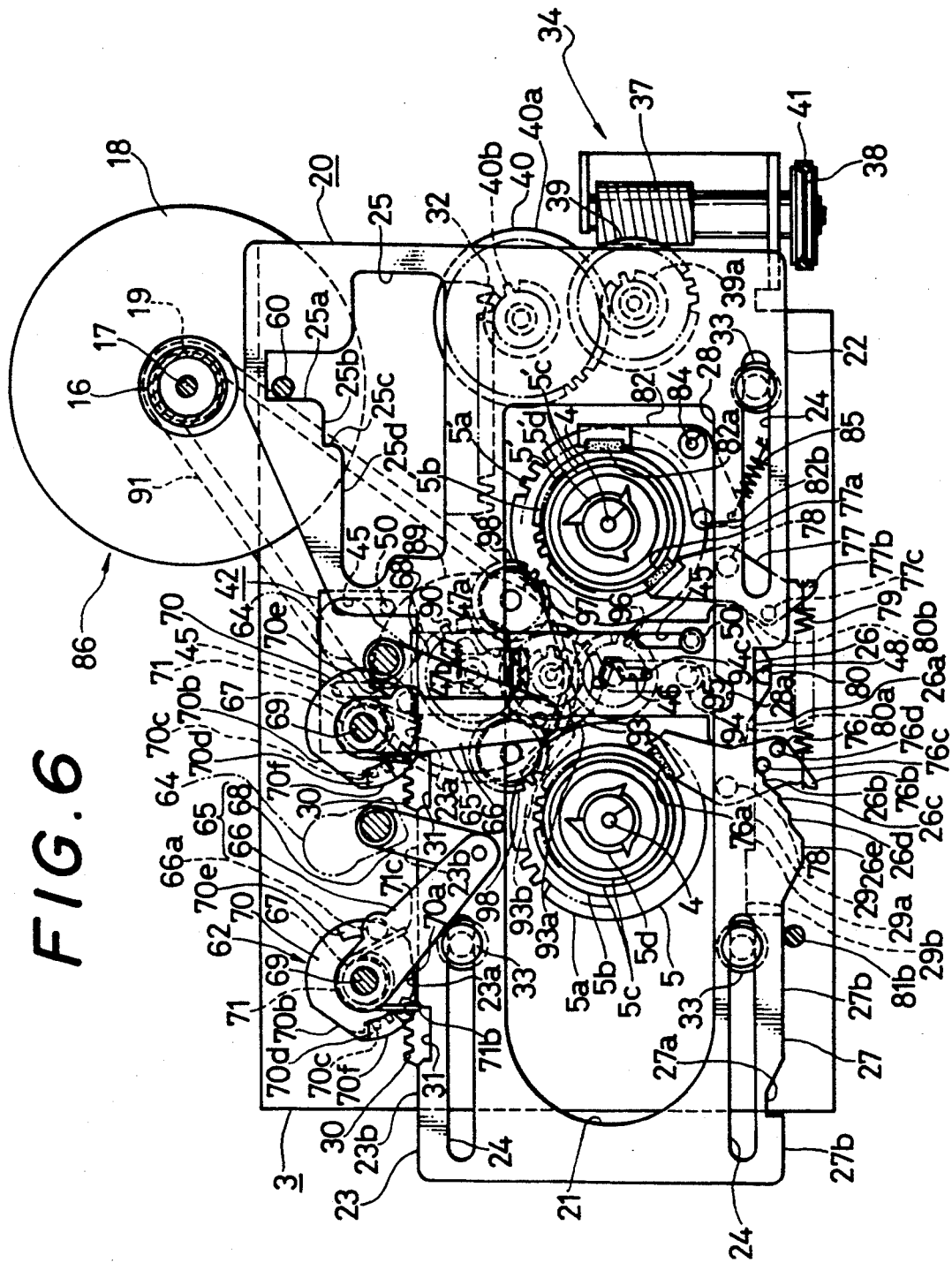
FIG. 6 is a horizontal sectional view, taken generally along the line VI—VI in FIG. 3, of the player.
Figure 7:
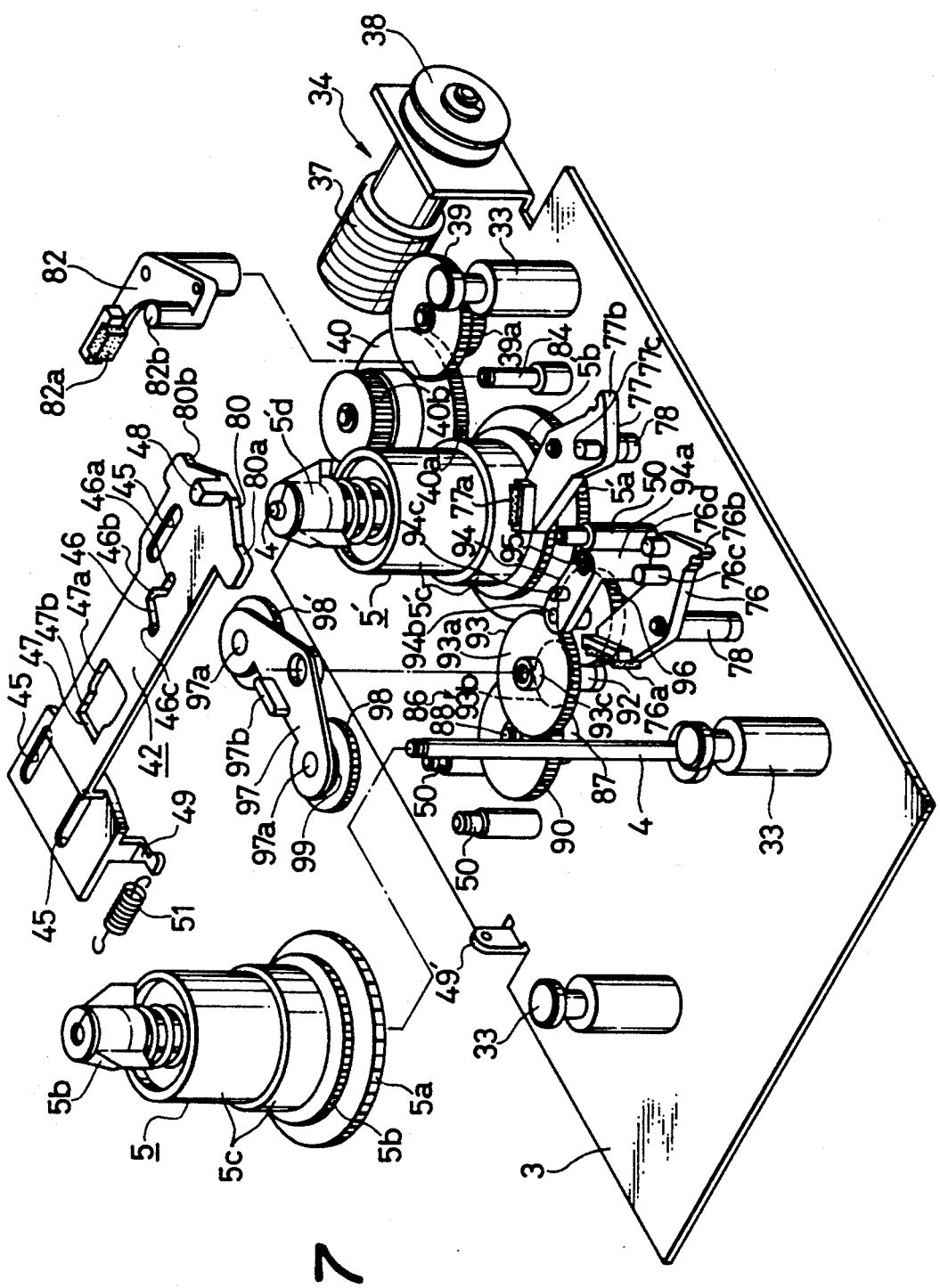
FIG. 7 is an exploded, fragmentary perspective view of the portion of the player depicted in FIG. 6.

The slider 20 has a large, interior cut-out portion 21 which divides the slider 20 into spaced apart, parallel, longitudinal members 22 and 23. A first cam face 26 for controlling the positions of an auxiliary slider 42 (hereinafter described), and a second cam face 27 for controlling a device, which is provided to give a back tension to the magnetic tape 15, are formed in the outer side of the longitudinal member 22 of the slider 20 (which lies in the lower side in FIG. 8). As shown in FIG. 6 and 7, a cam follower 48 projecting from the auxiliary slider 42 follows the cam face 26, and as shown in the lower left corner of FIG. 2 and in FIG. 3, a cam follower 81b projecting from a lever 81 of the device follows the cam face 27.

As shown in FIG. 8, other cam faces 28 and 28a for controlling another device, which is provided to give a back tension to the magnetic tape 15, are formed in the inner side of the first longitudinal member 22 (which faces the space 21 formed within the slider 20), and as shown in FIGS. 6 and 7, a cam follower 82b projecting from a lever 82 of the device follows the cam faces 28 and 28a.

To brake the reel bases 5 and 5′, a braking device is provided. As shown in FIG. 8, a further cam face 29 for controlling the braking device is formed in the outer side edge of the first longitudinal member 22 of the slider 20. The cam face 29 extends over a range of substantially half the length of the first cam face 26, just below the first cam face 26 which controls the position of the auxiliary slider 42. As shown in FIG. 7, a cam follower 76c projecting from one of two brake levers 76 and 77 of the braking device follows the cam face 29.

Again, as shown in FIG. 8, portions of the racks 30 are disposed on the outside edge of the second longitudinal member 23 of the slider 20. The two racks 30 (which lie near the left side of the slider 20 in FIG. 8) are spaced away from each other by a predetermined distance. Above the upper side of the rack 30, there is provided a recess 31. The two racks 30 are engaged with respective pinions 70 incorporated in a tape loading mechanism 62.

Another rack 32 is provided on the lower side of the slider 20 adjacent the edge of the longitudinal member 23 which faces the opening 21. The rack 32 is engaged with a reduction gear means 40 (FIGS. 3, 7) which transmits the torque of a motor 35 to the slider 20. The pair of reel bases 5 and 5′ project within the space 21 of the slider 20.

A slider transmitting mechanism is comprised of the motor 35 fixed to one end of the chassis 2 as shown in FIG. 2, a driving pulley 36 fixed to the shaft of the motor 35, a driven pulley 38 (FIG. 3) supported by the auxiliary chassis 3, a belt 41 looped between the driving pulley 36 and the driven pulley 38, a worm gear 37 which is rotatably secured to the auxiliary chassis 3 and to which the motor torque is transmitted through the driven pulley 38, as shown in FIGS. 6 and 7, a worm wheel 39 rotatably secured to the auxiliary chassis 3, and engaged with the worm gear 37, and the reduction gear means 40. It is noted that the reduction gear means 40 comprises a large gear 40a engaged with a small gear 39a which is formed integral with the worm wheel 39, and a small gear 40b engaged with the rack 32 of the slider 20.

Figure 1B:
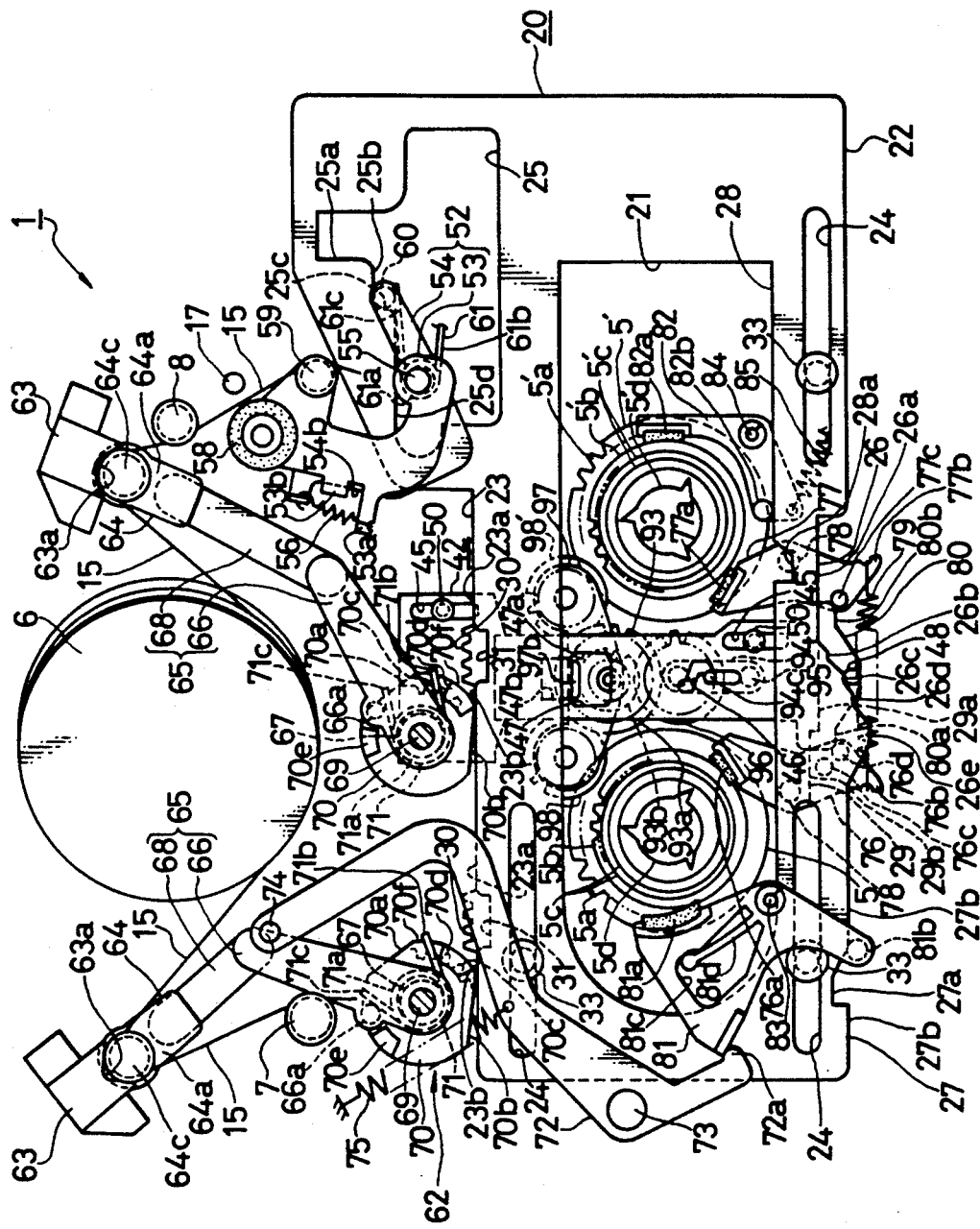
Figure 1D:
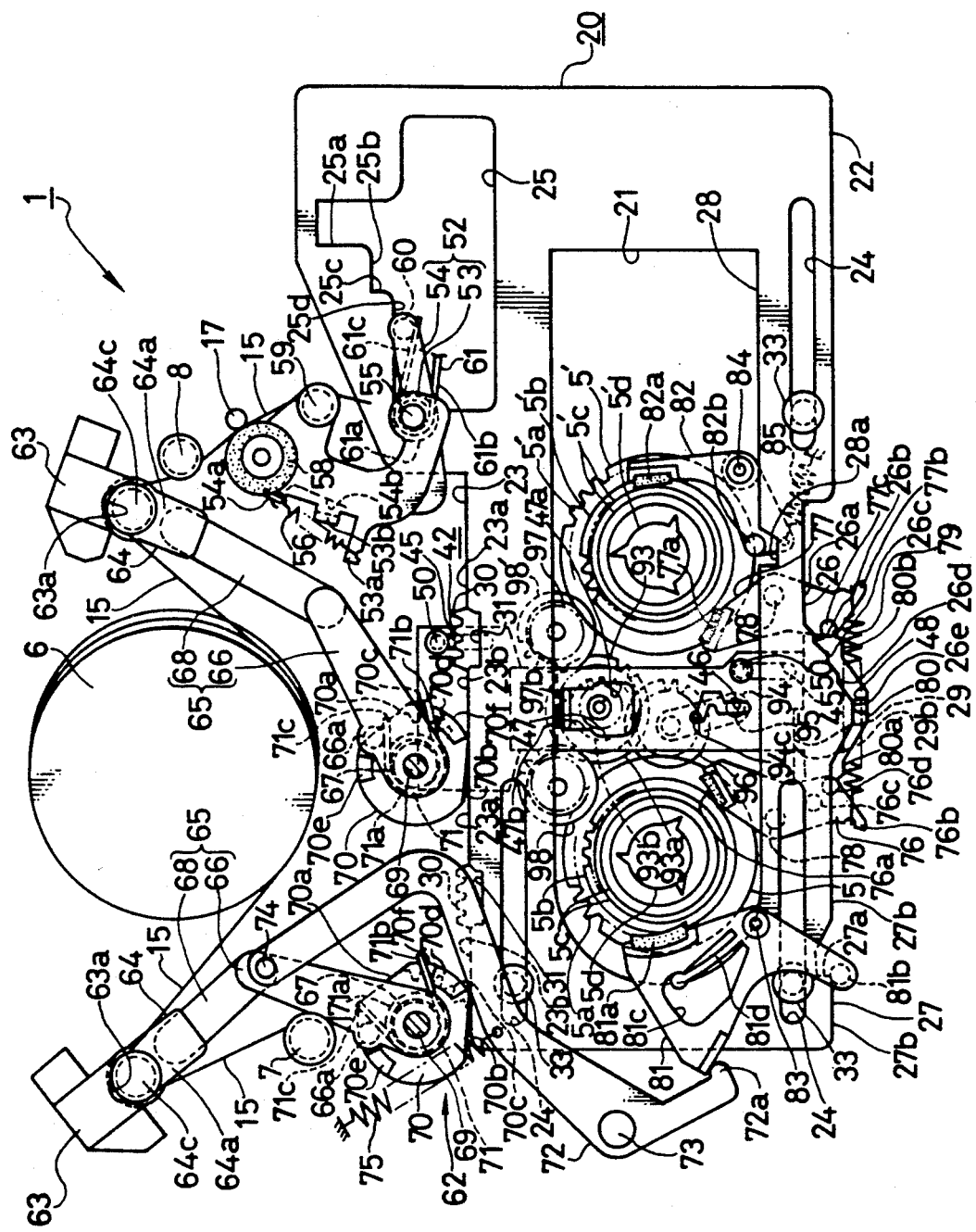

The mode changing slider 20 moves among five predetermined positions: a first position shown in FIGS. 2 and 6, where at least the tape cassette 10 can be ejected, a second position shown in FIG. 1A, where tape loading operation is completed, a third position shown in FIG. 1B, where the magnetic tape 15 can be run at high speed, a fourth position shown in FIG. 1C, where the magnetic tape 15 can be run in a normal direction thereof, and a fifth position shown in FIG. 1D, where the magnetic tape 15 can be run in a reverse direction. It is noted that the distance between the second position (FIG. 1A) and the third position (FIG. 1B) of the slider 20 is the same as the distance between the third position and the fourth position (FIG. 1C), the distance between the first position (FIG. 6) and the second position (FIG. 1A) is five times as large as the distance between the second position and the third position. The distance between the fourth position (FIG. 1C) and the fifth position (FIG. 1D) is one and a half times as large as the distance between the second position and the third position. Further, a detector (not shown) is secured to the lower side of the chassis 2 so as to detect the position of the slider 20.

The auxiliary slider 42

The auxiliary slider 42 is constituted by a narrow rectangular plate as shown in FIG. 7 and three slots 45 are provided at three corners of the plate 42. The auxiliary slider 42 is slidably supported by three guide pins 50 which project from the auxiliary chassis 3 as shown in FIG. 3, and are fitted into the respective slots 45. Thus, the auxiliary slider 42 is movable in a direction perpendicular to the travelling direction of the slider 20 just under the slider 20 as shown in FIG. 3. Further, as shown in FIG. 7, a tension spring 51 is stretched between spring anchors 49 and 49′ which project from the auxiliary slider 42 and the auxiliary chassis 3, respectively, so that the cam follower 48 of the auxiliary slider 42 is always pressed against the first cam face 26 of the slider 20 as shown in FIGS. 6 and 1A to 1D.

As shown in FIG. 7, the auxiliary slider 42 has a cam groove 46 and a restraining hole 47. The cam groove 46 is followed by a cam follower 94c projecting from an arm 94 which is rotatably secured to the auxiliary chassis 3. Further, to the free end of the arm 94, a swingable gear 96 is rotatably secured.

The cam groove 46 comprises a first portion 46a which is parallel to the longitudinal axis of the auxiliary slider 42, a second portion 46b which is aslant of the axial direction, and a third portion 46c which is aslant of the axial direction in a direction opposite to the second portion 46b. Thus, when the cam follower 94c is in the first portion 46a of the cam groove 46 as shown in FIGS. 6, 1A or 10, the swingable gear 96 is in a neutral position thereof so as to engage with neither of the large driven gears 5a and 5′a. When the cam follower 94c is in the second position 46b or in the third position 46c as shown in FIG. 1C or 1D, the swingable gear 96 engages with the large driven gear 5a or 5′a, respectively.

The restraining hole 47 is provided to restrain a projection 97b projecting from a lever 97 (FIG. 7), which is rotatably secured to the auxiliary chassis 3. Further, to the opposite end of the lever 97, swingable gears 98 and 98′ are rotatably secured.

When the projection 97b is in a wide portion 47a of the restraining hole 47, as shown in FIGS. 6, 1A or 1B, the projection 97b is not restrained by the restraining hole 47, so that it is possible to engage the swingable gear 98 with the small driven gear 5b of the supply reel base 5, or to engage the swingable gear 98′ with the small driven gear 5′b of the takeup reel base 5′.

When the projection 97b is in a narrow portion 47b of the restraining hole 47, as shown in FIG. 1C or 1D, the projection 97b is restrained from moving in the width direction of the restraining hole 47, so that neither of the swingable gears 98 and 98′ can engage with the respective small driven gears 5b and 5′b.

As shown in FIG. 7, the auxiliary slider 42 has a pair of symmetrical cam faces 80a and 80b at one end 80 thereof. The cam follower 48 projects upwards from the end 80 of the slider and between the cam faces 80a and 80b. The cam faces 80a and 80b are followed by cam followers 76d and 77c, for example, as illustrated in FIG. 1D. The cam followers 76d and 77c project from respective brake levers 76 and 77 (hereinafter described).

The reel base driving mechanism 86

Figure 9:
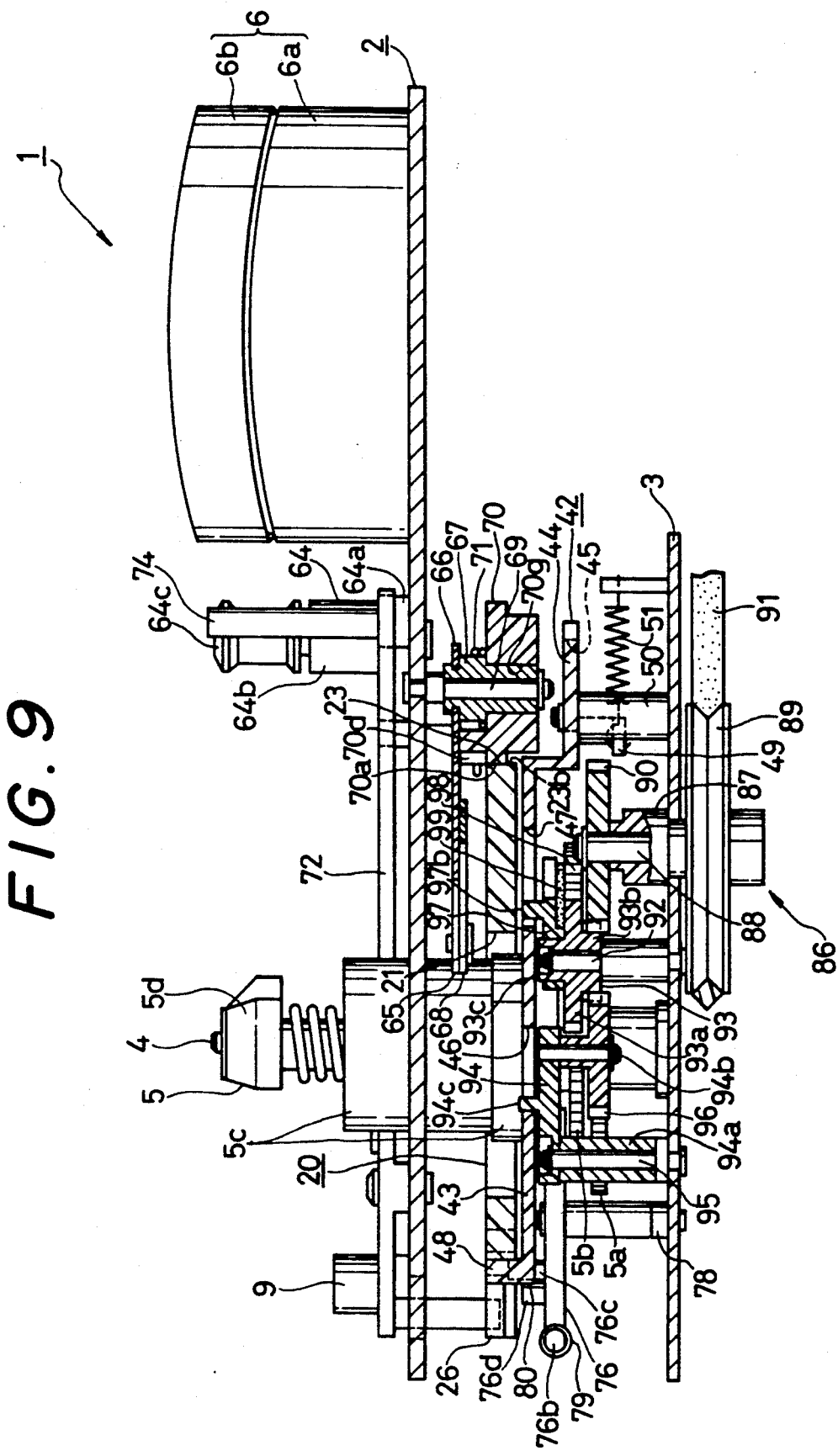
FIG. 9 is a sectional view taken generally along the line IX—IX on FIG. 2, with portions broken away.

As shown in FIGS. 6 and 7, intermediate gears 93 rotatably supported by a shaft 92, which projects from the auxiliary chassis 3, comprise a large gear 93a and a small gear 93b. The small gear 93b is engaged with the swingable gear 96 and a driving gear 90. As shown in FIG. 9, the driving gear 90 is fixed to the top of a shaft 88 rotatably supported by a sleeve 87, which is fixed to the auxiliary chassis 3, and to the bottom of the shaft 88, a driven pulley 89 is fixed.

A belt 91 is looped between the driven pulley 89 and the driving pulley 19 (FIGS. 3, 10), so that the torque of the capstan motor 18 is transmitted to the small driven gear 5b or to the small driven gear 5'b through the driving pulley 19, the driven pulley 89, the driving gear 90, the small gear 93b of the intermediate gear 93, and the swingable gear 96 in the order of mention. It is noted that the arm 94 is a narrow plate. A sleeve 94a extends downwards from the proximal end of the arm 94 and is engaged with a shaft 95 projecting from the auxiliary chassis 3. The swingable gear 96 is rotatably suspended by a shaft 94b projecting downwards from the free end of the arm 94.

As best shown in FIGS. 6 and 7, the lever 97 is a crooked plate, and the center of the lever 97 is rotatably supported by a cylindrical projection 93c projecting upwards from the center of the intermediate gears 93. The respective swingable gears 98 and 98' are rotatably suspended by shafts 97a extending downwards from each end of the lever 97, and always engaged with the large gear 93a of the intermediate gears 93. Further, friction plates 99 made of felt or the like are interposed between each of the swingable gears 98, 98' and the lever 97. Thus, the torque of the capstan motor 18 transmitted to the large gear 93a of the intermediate gears 93 can be transmitted to the small driven gear 5b of the supply reel base 5, or the small driven gear 5'b of the take-up reel base 5' through the swingable gear 98 or 98', respectively.

The pinch-roller transferring mechanism

As shown in FIG. 5, the pinch-roller transferring levers 52 comprise a substantially U-shaped, first lever 53 and a substantially L-shaped, second lever 54. The fulcrum of the first lever 53 is at one end thereof, a tape guide 59 projects from the other end, and a pin 57, on which a pinch-roller 58 is rotatable, projects from a position spaced a little away from the tape guide 59. Further, a spring anchor 53a and a hook 53b, which are spaced a little apart from each other, project substantially from an intermediate portion of the outer side of the first lever 53.

The second lever 54 has the fulcrum thereof substantially in an intermediate position of one of two elements which form the L-shape. The fulcrums of the levers 53 and 54 are axially aligned and, as will be described further herein, have a common fulcrum pin 55. The cam follower 60, which follows the cam faces 25a to 25d provided in the mode changing slider 20, projects downwards from the end of the fulcrumed element of the second lever 54. At the other end of the lever 54, there is a spring anchor 54a.

As shown in FIG. 2, after the first lever 53 is laid top of the second lever 54, and rotatably supported by a common fulcrum pin 55 on the chassis 2. A tension spring 56 is stretched between the spring anchor 53a of the first lever 53 and the spring anchor 54a of the second lever 54. As a result, the hook 53b of the first lever 53 engages with the outer side 54b of the second lever 54, and thereby, the first lever 53 and the second lever 54 are held together and integrated. It is noted that the cam follower 60 passes through an arcuate slot 2b provided in the chassis 2, and touches the cam faces 25a to 25d of the mode changing slider 20.

Moreover, a torsion spring 61 (FIG. 5) is interposed between the second lever 54 and the chassis 2. The fulcrum pin 55 passes through the coiled portion 61a of the torsion spring 61. As shown in FIG. 2, one end 61b of the torsion spring 61 is engaged with a spring stop 2c provided in the chassis 2, and the other end 61c of the torsion spring 61 is pressed against the cam follower 60 at the right side thereof in FIG. 2, so that the cam follower 60 is pressed against one end of the arcuate slot 2b.

The brake operating mechanism

Reference numerals 76 and 77 shown in FIG. 7 denote the pair of brake levers of the brake operating mechanism, which are rotatably supported by a pair of shafts 78 projecting from the auxiliary chassis 3, respectively. As shown in FIG. 1A, to one end of each brake lever 76, 77, a brake shoe 76a, 77a is secured, and at the other end, a spring stop 76b, 77b is provided, respectively. Further, a tension spring 79 is stretched between the spring stops 76b and 77b, so that the brake shoes 76a and 77a are pressed against respective lower portions of the stepped brake drums 5c and 5'c (FIG. 7) on the sides thereof opposite to each other.

As shown in FIGS. 6 and 7, the cam follower 76c. which follows the cam face 29 of the slider 20, projects from the brake lever 76 adjacent to the spring stop 76b. The cam follower 76d, which follows the cam face 80a of the auxiliary slider 42, projects from a position between the cam follower 76c and the spring stop 76b, and similarly, the cam follower 77c. which follows the cam face 80b of the auxiliary slider 42, projects from a position of the brake lever 77, corresponding to the cam follower 76d of the brake lever 76.

The back-tension exerting mechanism

Figure 4:
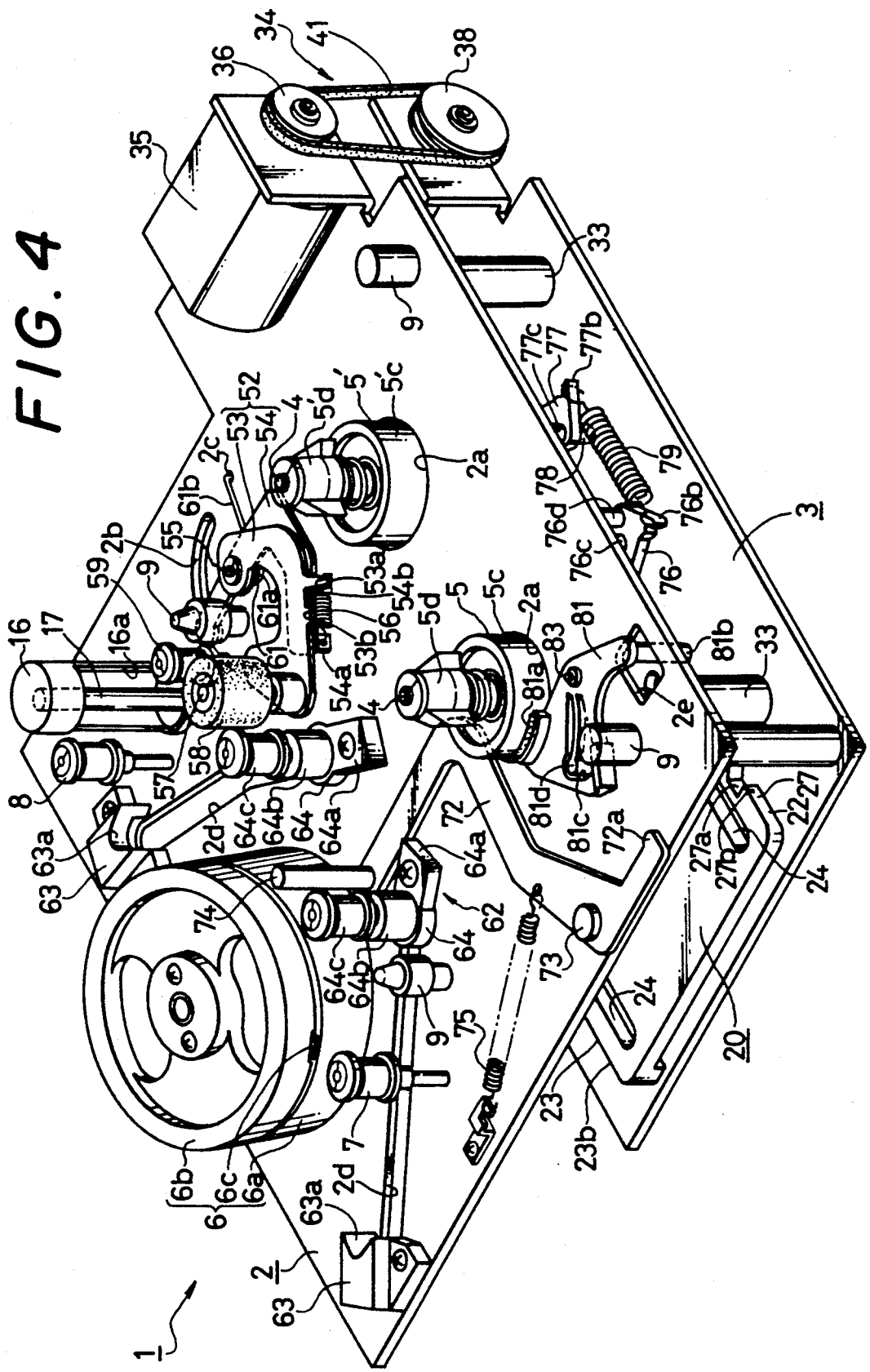
FIG. 4 is a perspective view of a principal part of the player of FIG. 2.

As shown in FIGS. 1A to 2, 4, and 7, a pair of levers 81 and 82 of the back-tension exerting mechanism are provided to back tension the magnetic tape 15. As shown in FIG. 4, each lever 81 or 82 is rotatably supported by a shaft 83 or 84, respectively. To one end of the lever 81 or 82, a brake shoe 81a or 82a is secured, respectively. From the other end of lever 81 a cam follower 81b projects downwards. The cam follower 81b passes through a rectangular hole 2e in the chassis 2 and comes in contact with the cam face 27 of the slider 20. On the other hand, the cam follower 82b, which follows the cam faces 28 and 28a of the slider 20, projects upwards from the other end of the lever 82, as shown in FIG. 3.

As shown in FIGS. 2 and 4, one side of the lever 81, to which the brake shoe 81a is secured, is substantially sectorial in shape, and has an opening 81c. Into the opening 81c, a resilient piece 81d projects from a side of the opening 81c near to the shaft 83 (in the drawing, the resilient piece 81d is in a state of being elastically deflected), and the free end of the resilient piece 81d is secured to the chassis 2 so as to normally press the brake shoe 81a against the brake drum 5c of the supply reel base 5, as shown in FIG. 1C. Similarly, the brake shoe 82a of the lever 82 is pressed against the brake drum 5'c, as shown in FIG. 1D due to the force of a tension spring 85 stretched between the lever 82 and the auxiliary chassis 3.

Reference numeral 72 in FIG. 2 is a tension regulating arm having the shape of the letter "2". At a point near to one end of the arm 72, it is rotatably secured to the chassis 2 through a shaft 73, and a pin 74 projects from the other end of the arm 72. Further, a tension spring 75 is stretched between the arm 77 and the chassis 2, so that in FIG. 2, the arm 72 is urged counterclockwise so far that the other end of the arm 72 abuts against a movable base 64a (hereinafter described) of the tape loading mechanism 62.

The tape loading mechanism 62

As shown in FIGS. 2 and 8, the tape loading mechanism 62 comprises a pair of guide grooves 2d provided in the chassis 2, respective tape loading posts 64 guided by the pair of guide grooves 2d, the pair of partially toothed pinions 70 engaged with the respective racks 30 of the mode changing slider 20, and a pair of link devices 65, each having a first link 66 and a second link 68, connecting the tape loading post 64 to the pinion 70.

The guide grooves 2d are arranged to extend aslant on respective right and left sides of the head drum 6 in FIG. 2 in such a way that they diverge toward the edge of the chassis 2 at the upper side of FIG. 2. Respective positioning blocks 63, which have V-shaped contact faces 63a, are secured to the ends of the two guide grooves 2d which are spaced the furthest away from each other.

As shown in FIG. 4, the tape loading post 64 projects upwards from a movable base 64a guided by the guide groove 2d, and has a cylindrical surface at the lower end thereof, which serves as a contact face 64b with the positioning block 63, and a flanged roller rotatably supported by the upper end thereof, which serves as a tape loading member 64c.

As shown in FIG. 8, the construction of each link device is substantially the same and will be given for only one of the devices. The second link 68 is rotatably connected with the movable base 64a at one end thereof, and is also rotatably connected, at the other end thereof, with one end of the first link 66 of the link device 65. The first link 66 has substantially the same length as the second link 68. Further, the other end of the first link 66 is fixedly connected with a sleeve 67 (FIG. 9) into which a shaft 69 fixed to the chassis 2 is loosely fitted. The partially toothed pinion 70 engaged with the rack 30 of the slider 20 has a central hole 70g (FIG. 9), and a small diameter portion of the stepped sleeve 67 is loosely fitted into the central 70g.

As shown in FIG. 8, the upper part of the partially toothed pinion 70 has a pair of flat portions 70a and 70b which form an acute angle with each other. An overhang portion 70f extending over the toothed portion 70c is interposed between the ends of flat portions 70a and 70b. Further, a spring stop 70d projects upwards from the overhang portion 70f, and a projection 70e, located diametrically opposite to the spring stop 70d, projects upwards between the ends of the flat portions 70a and 70b.

The coiled portion 71a of a torsion spring 71 is fitted into a large diameter portion (FIG. 9) of the stepped sleeve 67. One end 71b of the torsion spring 71 is engaged with the spring stop 70d, as shown in FIG. 8. The other end 71c of the torsion spring 71 is engaged with a spring stop 66a which projects downwards from the first link 66 so that the pinion 70 can be biased in a clockwise direction, for example, in FIG. 6 with respect to the first link 66. When the spring stop 66a of the first link 66 abuts against the projection 30e of the pinion 70, as shown in FIG. 6, the first link 66 and the pinion 70 become a unitary member.

The functions of the digital audio tape player (R-DAT)

(1) Relations between the mode changing slider 20 and the auxiliary slider 42

The first cam face 26 of the slider 20 has five steps: a first step 26a, a second step 26b, a third step 26c, a fourth step 26d and a fifth step 26e. As the mode changing slider 20 is moved to the right in FIG. 6, the cam follower 48 of the auxiliary slider 42 ascends the steps 26a to 26e in turn, so that the auxiliary slider 42 is moved in a direction perpendicular to the motion of the slider 20 against the force of the spring 51.

That is, when the slider 20 is located in a first position shown in FIG. 6, the cam follower 48 is in contact with the first cam face 26 at a position within the first step 26a and spaced away from the second step 26b. When the slider 20 is located in a second position shown in FIG. 1A, the cam follower 48 is in contact with the second step 26b. When the slider 20 is located in a third position shown in FIG. 1B, the cam follower 48 is in contact with the third step 26c. When the slider 20 is located in a fourth position shown in FIG. 1C, the cam follower 48 is in contact with the fourth step 26d. Finally, when the slider 20 is located in a fifth position shown in FIG. 1D, the cam follower 48 is in contact with the fifth step 26e.

(2) In a first mode position (FIGS. 2 and 6)

The cam follower 60 of the pinch-roller transferring mechanism abuts against the left end of the arcuate slot 2b of the chassis 2 as viewed in FIG. 2, and is in a contact with the first cam face 25a, as shown in FIG. 6.

The movable base 64a of the tape loading mechanism 62 is located at the lower side of the guide groove 2d as viewed in FIG. 2. The links 66 and 68 of the link devices 65 are folded so as to form the shape of the letter "v", as shown in FIG. 6. The partially toothed pinion 70 is locked, since one of the flat portions 70a and 70b is in contact with a small portion 23a of the outside of the longitudinal member 23 of the slider 20, as shown in FIG. 6, the small portion 23a being adjacent to the right ends of the rack 30 and the recess 31, as viewed in FIG. 8.

As shown in FIGS. 6 and 8, the cam follower 76c of the brake operating mechanism is in contact with a first step 29a of the stepped cam face 29 of the slider 20, which is flush with the first step 26a the first cam face 26, so that the brake shoe 76a secured to the brake lever 76 is separated from the brake drum 5c of the supply reel base 5. The brake shoe 77a secured to another brake lever 77 is pressed against the brake drum 5'c of the take-up reel base 5'.

As shown in FIGS. 2 and 8, the cam follower 81b of the back-tension exerting mechanism is in contact with a first step 27b of the stepped cam face 27 of the slider 20, so that the brake shoe 81a secured to the lever 81 of the back-tension exerting mechanism is separated from the brake drum 5c of the supply reel base 5. It is noted that the above state of the back-tension exerting mechanism is held even when the slider 20 is in the positions shown in FIG. 1A, 1B and 1D.

Similarly, as shown in FIGS. 6 and 8, the cam follower 82b of the back-tension exerting mechanism is in contact with the cam face 28 of the slider 20, so that the brake shoe 82a secured to the lever 82 of the back-tension exerting mechanism is separated from the brake drum 5'c of the take-up reel base 5'. It is noted that the above state of the back-tension exerting mechanism is held even when the slider 20 is in the positions shown in FIGS. 1A to 1C.

In the meantime, the tension regulating arm 72, which has been located in the position shown in FIG. 2 because of being abutted to the movable base 64a, rotates on the shaft 73 due to force of the tension spring 75 as the movable base 64a is moved toward the positioning block 63, and stops rotating as the end 72a, which is in opposed relation to the other end from which the pin 74 projects, abuts against the back side of the lever 81.

(3) In a second mode position (FIG. 1A)

The cam follower 60 of the pinch-roller transferring mechanism, which is located in the position shown in FIG. 6, is pushed by the first cam face 25a, and revolved clockwise as viewed in FIGS. 5 and 6 around the fulcrum pin 55, as the slider 20 is moved in the normal direction. Thus, the cam follower 60 begins to follow the second cam face 25b, as shown in FIG. 1A. The pinch-roller 58, having been located in the position shown in FIG. 2, is transferred to a preparatory position shown in FIG. 1A. There, the pinch-roller 58 is spaced apart from the capstan 17 by a predetermined distance due to clockwise rotation of the pinch-roller transferring levers 52. It should be noted that as illustrated in FIG. 10, the cam follower 60 is kept in contact with the second cam face 25b even in a third mode position (FIG. 10) to be described hereinafter.

The partially toothed pinion 70 of the tape loading mechanism 62, which is located in the position shown in FIG. 6, is rotated counterclockwise, as viewed in FIG. 1A, due to engagement with the rack 30. Simultaneously, the slider 20 is moved in the normal direction, and thereby, the folded links 66 and 68 shown in FIG. 6 are extended as shown in FIG. 1A. Thus, the tape loading post 64 reaches the position shown in FIG. 1A, where the movable base 64a is in contact with the positioning block 63, at a time a little before the slider 20 reaches the second position.

When the slider 20 reaches the second position, the partially toothed pinion 70 is disengaged from the rack 30, as shown in FIG. 1A, and the other flat portion 70b of the pinion 70 comes in contact with a small portion 23b of the outside of the longitudinal member 23 of the slider 20, so that the pinion 70 is locked. It should be noted that the recess 31 is disposed over the length of the rack 30, so that rotation of the pinion 70 is not interfered with when the pinion 70 engages with the rack 30. The small portion 23b is provided adjacent to the left end of the rack 30 and recess 31 as viewed in FIG. 8.

During this time, after the first link 66 stops rotating due to contact of the second link 68 with the positioning block 63, the pinion 70 is rotated counterclockwise so that the projection 70e 1 is separated from the spring stop 66a of the first link 66. Thus, a clockwise torque is exerted on the pinion 70 so that the pinion 70 can be securely locked, and a counterclockwise torque is exerted on the first link 66 so that the movable base 64a can be pressed against the positioning block 63 by the force of the torsion spring 71. It should be noted that the above-mentioned state of the tape loading mechanism 62 is held even when the slider 20 is in the positions shown in FIG. 1B, 1C, and 1D.

When the slider 20 is moved in the second position shown in FIG. 1A, the cam follower 76c of the brake operating mechanism faces the second step 29b of the stepped cam face 29 of the slider 20, so that the brake shoe 76a secured to the brake lever 76 is pressed against the brake drum 5c of the supply reel base 5, and at the same time, the cam followers 76d, 77c of the brake lever 76, 77, respectively, come near to the cam faces 80a, 80b, respectively, of the auxiliary slider 42.

(4) In a third mode position (FIG. 10)

While the slider 20 is moved from the second position shown in FIG. 1A to the third position shown in FIG. 10, the cam followers 76d, 77c of the brake operating mechanism are pushed by the cam faces 80a, 80b, respectively, and the brake shoes 76a, 77a are separated from the brake drums 5c, 5'c, respectively, as shown in FIG. 10, due to rotation of the brake levers 76, 77, respectively. It should be noted that the above state of the brake operating mechanism is held even when the slider 20 is in the positions shown in FIG. 1C and 1D, since the cam faces 80a, 80b extend in a direction parallel to the movement of the auxiliary slider 42.

(5) In a fourth mode position (FIG. 1C)

While the slider 20 is moved from the third position shown in FIG. 10 to the fourth position shown in FIG. 1C, the cam follower 60 of the pinch-roller transferring mechanism is pushed by the cam face 25c, and revolved clockwise around the fulcrum pin 55 so far that the cam follower 60 mounts the cam face 25d.

For the duration of the above motion of the cam follower 60, the pinch-roller transferring lever 52 is rotated clockwise as viewed in FIG. 10 so far that the pinch-roller 58 abuts against the capstan 17, and after the first lever 53 stops rotating due to contact of the pinch-roller 58 with the capstan 17, only the second lever 54 is successively rotated against the force of the tension spring 56. Thus, the pinch-roller is pressed against the capstan 17 due to force of the tension spring 56. It should be noted that the above state of the pinch-roller transferring mechanism is held even when the slider 20 is the position shown in FIG. 1D.

When the slider 20 reaches the fourth position thereof shown in FIG. 1C, the cam follower 81b of the left lever 81 (FIG. 1C) of the back-tension exerting mechanism faces the second step 27a of the stepped cam face 27, so that the brake shoe 81a secured to the lever 81 is pressed against the brake drum 5c of the supply reel base 5 due to force of the resilient piece 81d.

In addition, as the lever 81 rotates clockwise as viewed in FIG. 10, the tension regulating arm 72, whose end 72a is in contact with the back side of the lever 81, is rotated counterclockwise due to the force of the tension spring 75, and as a result, the pin 74 of the tension regulating arm 72 is pressed against the magnetic tape 15 under a predetermined pressure, as shown in FIG. 1C.

(6) In a fifth mode position (FIG. 1D)

When the slider 20 reaches the fifth position thereof shown in FIG. 1D, the cam follower 82b of the right lever 82 (as viewed in FIG. 1D) of the back-tension exerting mechanism faces the recess 28a, so that the brake shoe 82a secured to the lever 82 is pressed against the brake drum 5'c of the take-up reel base 5' due to force of the tension spring 85.

(7) Tape loading operation

The tape cassette 10 is mounted on the digital audio tape player in the state shown in FIG. 2. The pair of tape reels 14 and 14' are engaged with the respective reel engaging shafts 5d and 5'd of the pair of reel bases 5 and 5'. At that time, the pinch-roller 58, the movable tape guide 59, the tape loading members 64c and the pin 74 of the tension regulating arm 72 are positioned within the recess 12b of the tape cassette 10 so as to be surrounded by the recess 12b and the stretched tape 15.

While the mode changing slider 20 is moved from the first position thereof, shown in FIG. 6 to the second position thereof, shown in FIG. 1A, the magnetic tape 15 wound around the supply reel 14 is drawn out by the tape loading mechanism 62 and stretched, in turn, among the stationary tape guide 7, the tape loading member 64c, the head drum 6, another tape loading member 64c, another stationary tape guide 8, the pinch-roller 58 located in the preparatory position thereof, and the movable tape guide 59 which is located near to the right opening 12b (as viewed in FIG. 2). It should be noted that the supply reel base 5 is braked by the brake operating mechanism, and the pin 74 of the tension regulating arm 72 is not in contact with the magnetic tape 15 yet, because the end 72a is in contact with the lever 81 of the back tension exerting mechanism.

As to the reel base driving mechanism, the swingable gear 96 is not put in action because the arm 94 is in a neutral position, and similarly, the swingable gears 98 and 98' are not put in action because the lever 97 is in a neutral position.

(8) Tape unloading operation

While the slider 20 is moved from the second position thereof, shown in FIG. 1A, to the first position thereof, shown in FIGS. 2 and 6, the tape loading post 64 is returned to the position shown in FIG. 2, and the pinch-roller 58 is also returned to the position shown in FIG. 2. Further, the supply reel base 5 is released from the brake.

Substantially at the same time, the capstan motor 18 is driven in the normal direction, and thereby the intermediate gears 93 are rotated counterclockwise as viewed in FIG. 6, so that the lever 97 is rotated counterclockwise. The swingable gear 98 is engaged with the small driven gear 5b of the supply reel base 5. Thus, the supply reel 14, which is engaged with the supply reel base 5, is rotated at high speed to wind the drawn-out tape 15.

(9) Fast forward (FF) mode and Rewind (REW) mode

When the slider 20 is moved from the second position thereof, shown in FIG. 1A, to the third position thereof, shown in FIG. 10, the reel bases 5 and 5' are released from the brake. The pinch-roller 58, the levers 81 and 82 of the back-tension exerting mechanism and the tension regulating arm 72, shown in FIG. 10, are in the same positions as those shown in FIG. 1A. Further, the arm 94 of the reel base driving mechanism is immovably held in the neutral position, and the lever 97 of the reel base driving mechanism is in the neutral position but is swingable.

When the fast forward mode is selected, the capstan motor 18 is driven in the reverse direction thereof, so that the intermediate gears 93 are rotated clockwise, as viewed in FIG. 20, the lever 97 is, thereby, rotated clockwise, and the swingable gear 98' is engaged with the small driven gear 5'b of the take-up reel base 5'. Thus, the take-up reel base 5' is rotated clockwise to wind the tape 15 on the take-up reel 14'.

When the rewind mode is selected, the capstan motor 18 is driven in the normal direction thereof, so that the supply reel base 5 is rotated counter-clockwise as viewed in FIG. 10 to wind the tape 15 on the supply reel 14.

(10) Forward play (FWD-PB) mode

To establish the forward play mode of the player, the mode changing slider 20 is moved to the fourth position, as shown in FIG. 1C. Thus, the pinch-roller 58 is pressed against the capstan 17 so as to sandwich the magnetic tape 15 between them. The brake shoe 81a of the back-tension exerting mechanism comes in contact with the supply reel base 5, and as a result, the pin 74 of the tension regulating arm 72 comes in contact with the magnetic tape 15. Further, the arm 94 of the reel base driving mechanism is rotated to engage the swingable gear 96 with the large driven gear 5'a of the takeup reel base 5'. The lever 97 of the reel base driving mechanism is locked in the neutral position, because the cam follower 48 of the auxiliary slider 42 comes in contact with the fourth step 26d of the first cam face 26.

When the capstan motor 18 is driven in the reverse direction thereof, the capstan 17 is rotated counter-clockwise, as viewed in FIG. 1C, and the intermediate gears 93 are rotated clockwise, so that the swingable gear 96 is rotated counter-clockwise. Thus, the take-up reel base 5' is rotated clockwise to wind the magnetic tape 15 on the take-up reel 14'.

The magnetic tape 15 is driven by the capstan 17 and pinch-roller 58 to run at constant speed in the normal direction thereof, and information is reproduced from the magnetic tape 15 through the rotated head drum 6. At that time, the brake shoe 81a of the back-tension exerting mechanism is pressed against the brake drum 5c of the supply reel base 5 so as not to make the magnetic tape 15 slacken. The pin 74 of the tension regulating arm 72 is brought into contact with the magnetic tape so as to adjust the tension of the magnetic tape 15. It is to be noted that a recording (REC) mode will be established in a similar way.

(11) Reverse play (REV-PB) mode To establish the reverse play mode of the player, the mode changing slider 20 is moved to the fifth position, as shown in FIG. 1D. Thus, the brake shoe 81a of the back-tension exerting mechanism is separated from the supply reel base 5 and as a result, the pin 74 of the tension regulating arm 72 is also separated from the magnetic tape 15. At the same time, the brake shoe 82a of the back-tension exerting mechanism comes in contact with the take-up reel base 5'.

The arm 94 of the reel base driving mechanism is rotated to engage the swingable gear 96 with the large driven gear 5a of the supply reel base 5, and the lever 97 of the reel base driving mechanism is locked in the neutral position, because the cam follower 48 of the auxiliary slider 42 comes in contact with the fifth step 2e of the first cam face 26. It should be noted that the magnetic tape 15 is in a state of being sandwiched between the capstan 17 and the pinch-roller 58.

When the capstan motor 18 is driven in the normal direction thereof, the capstan 17 is rotated clockwise, as viewed in FIG. 1D, and the intermediate gears 93 are rotated counterclockwise, so that the swingable gear 96 is rotated clockwise. Thus, the supply reel base 5 is rotated counterclockwise to wind the magnetic tape on the supply reel 14.

In the above-described embodiment toothed gears are employed as the driving elements. It should be apparent that in other, less advantageous embodiments, toothless wheels could be employed in place of the gears to achieve the same reduction ratios and direction reversing features. Such wheels would not, however, offer the precision driving relationship which is obtainable by using gears. In the following claims, "gears" is to be understood in its broadest sense as including wheels.

Although the present invention has been shown and described with respect to preferred embodiments, various changes and modifications which are obvious to a person skilled in the art to which the invention pertains are deemed to lie within the spirit and scope of the invention.

What is claimed is:

1. A mode changing mechanism for a tape cassette recording and/or reproducing apparatus of the type including rotary head drum means for recording information on and/or reproducing information from a magnetic tape, a capstan for driving the tape past the rotary head drum means, pinch-roller transferring means, including a rotatably supported pinch-roller, for pressing the pinch-roller against the capstan, a pair of reel bases capable of being engaged with a pair of tape reels which are accommodated in a tape cassette loaded into the tape cassette recorder and/or reproducing apparatus, and on which the magnetic tape is wound, tape loading means for drawing out the magnetic tape from the tape cassette and leading the tape to a predetermined tape path including the periphery of the rotary head drum means, a tape reel drive motor, reel base driving means for selectively imparting torque from the tape reel drive motor to either of the pair of reel bases, control means for controlling the action of the reel base driving means, and brake operating means for braking the pair of reel bases under predetermined conditions, wherein the mode changing mechanism comprises:

(a) mode changing means, including a mode changing slider moveable in parallel with a line passing through the centers of the pair of reel bases, integral first regulatory drive means for driving the tape loading means under a first set of predetermined conditions, second regulatory drive means for driving the pinch-roller transferring means under a second set of predetermined conditions, third regulatory drive means for driving the control means under a third set of predetermined conditions, and fourth regulatory drive means for driving the brake operating means under a fourth set of predetermined conditions, wherein the mode changing slider includes cam faces and at least one rack gear, the rack gear being engagible with the first regulatory drive means and separate ones of the cam faces being engagible with the second regulatory drive means and the fourth regulatory drive means; and (b) slider driving means for driving the mode changing slider in accordance with a selected one of a plurality of modes, each mode corresponding to a different combination of the first to fourth sets of predetermined conditions.

2. A mode changing mechanism according to claim 1, in which the mode changing slider is moved in parallel with a line passing through the centers of the pair of reel bases so as to be located in a first mode position where at least the tape cassette can be ejected, in a second mode position where tape loading is completed with the help of the tape loading means, in a third position where a fast forward/rewind (FF/REW) mode is established, in a fourth position where a forward-playback/record (FWD-PB/REC) mode is established, and in a fifth position where a reverse-playback (REV-PB) mode is established.

3. A mode changing mechanism according to claim 2 in which the tape loading means is changed from a pre-loading state to a post-loading state when the mode changing slider is moved from the first mode position to the second mode position, and is held in the post-loading state even if the mode changing slider is moved from the second mode position to the fifth mode position through the third mode position and the fourth mode position.

4. A mode changing mechanism according to claim 2, in which the tape loading means comprises a tape loading post for drawing the tape out of the cassette and wherein the tape loading post is movable between a pre-loading position arranged within the mounted tape cassette, and a post-loading position where the magnetic tape drawn out from the tape cassette by the tape loading post is led to the predetermined tape path including the periphery of the rotary head drum means.

5. A mode changing mechanism according to claim 4 in which the tape loading means is changed from a pre-loading state to a post-loading state when the mode changing slider is moved from the first mode position to the second mode position, and is held in the post-loading state even if the mode changing slider is moved from the second mode position to the fifth mode position through the third mode position and the fourth mode position.

6. A mode changing mechanism according to claim 1, wherein the tape loading means comprises a chassis and wherein the pinch-roller transferring means comprises a lever for rotatably supporting the pinch-roller, the lever being pivotally mounted on the chassis, and a spring which urges the lever in a direction so as to separate the lever from the capstan.

7. A mode changing mechanism according to claim 6, in which the second regulatory drive means comprises a cam follower which projects from the lever of the pinch-roller transferring means and follows one of the cam faces.

8. A mode changing mechanism according to claim 1, in which the brake operating means is moveable to a position where the reel base is braked and a position where the reel base is released.

9. A mode changing mechanism according to claim 2, in which the pinch-roller transferring means is moveable to locate the pinch-roller in an inactive position arranged within the mounted tape cassette, a preparatory position a little spaced away from the capstan, and an active position pressed against the capstan.

10. A mode changing mechanism according to claim 9, in which the pinch-roller transferring means transfers the pinch-roller from an inactive position to a preparatory position when the mode changing slider is moved from the first mode position to the second mode position, holds the pinch-roller in the preparatory position while the mode changing slider is moved from the second mode position to the third mode position, transfers the pinch-roller from the preparatory position to an active position when the mode changing slider is moved from the third mode position to the fourth mode position, and holds the pinch-roller in the active position while the mode changing slider is moved from the fourth position to the fifth position.

11. A mode changing mechanism according to claim 1, wherein the tape loading means comprises a chassis and in which the reel base driving means comprises a plurality of gears and a swingable arm which rotatably supports a first gear of the plurality of gears to enable it to be selectively engaged with either one of the reel bases so as to impart a torque thereto in a forward-/reverse (FWD/REV) mode, and a swingable lever which rotatably supports a plurality of the gears to enable a different one of them to be selectively engaged with a different one of the reel bases so as to impart the torque thereto in a fast forward/rewind (FF/REW) mode.

12. A mode changing mechanism according to claim 11, in which the reel base driving means comprises an auxiliary slider movable to a first mode through fifth mode positions in a direction perpendicular to the movement of the mode changing slider so as to locate the swingable arm in a FWD position, in a neutral position, or in a REV position, and locate the swingable lever in a locking position or in a releasing position.

13. A mode changing mechanism according to claim 12, in which the swingable lever used for establishing the FF/REW mode is held in a releasing position while the auxiliary slider is moved from the first mode position to the third mode position through the second mode position; located in a locking position when the auxiliary slider is moved from the third mode position to the fourth mode position; and held in the locking position while the auxiliary slider is moved from the fourth mode position to the fifth mode position.

14. A mode changing mechanism according to claim 12, in which the third regulatory drive means comprises a cam follower which projects from the auxiliary slider and follows another one of the cam faces.

15. A mode changing mechanism according to claim 12 in which the swingable arm used for establishing the FWD/REV mode is held in a neutral position, with first gear unengaged with either of the reel bases, while the auxiliary slider is moved from the first mode position to the third mode position through the second mode position; moved to a position for establishing the FWD mode when the auxiliary slider is moved from the third mode position to the fourth mode position; and moved to a position for establishing the REV mode when the auxiliary slider is moved from the fourth mode position to the fifth mode position.

16. A mode changing mechanism according to claim 15, further comprising a cam follower and wherein the auxiliary slider has a cam groove therein, the swingable arm used for establishing the FWD/REV mode is rotatably secured to a chassis at one end thereof, rotatably supports the swingable gear at the other end thereof, and the cam follower is mounted on the swingable arm to follow the cam groove provided in the auxiliary slider.

17. A mode changing mechanism according to claim 16, in which the swingable lever used for establishing the FF/REW mode is rotatably secured at its approximate midpoint to the chassis; rotatably supports a swingable pair of the plurality of gears at its opposite ends, the swingable gears being selectively engageable with a different one of the reel bases; and has a projection fitted into a restraining hole which is provided in the auxiliary slider.

18. A mode changing mechanism according to claim 1, in which the brake operating means comprises separate brake shoes for the supply reel base and the take-up reel base, and separate back-tension exerting means for the supply reel base and the take-up reel base.

19. A mode changing mechanism according to claim 18, in which one of the back-tension exerting means, which is put in action by being pressed against the supply reel base, is held in an inactive position while the mode changing slider is moved from the first mode position to the third mode position through the second mode position, and located in an active position when the mode changing slider is moved from the third mode position to the fourth mode position; the other of the back-tension exerting means, which is put in action by being pressed against the take-up reel base, is held in an inactive position while the mode changing slider is moved from the first mode position to the fourth mode position through the second mode position and the third mode position, and located in an active position when the mode changing slider is moved from the fourth mode position to the fifth mode position; one of the brake shoes, which is put in action only when it is pressed against the supply reel base, is held in an inactive position except when the mode changing slider is in the second mode position, and held in an active position only when the mode changing slider is in the second mode position; and the other of the brake shoes, which is put in action only when it is pressed against the take-up reel base, is held in an inactive position while the mode changing slider is in the third mode position to the fifth mode position, and held in an active position while the mode changing slider is in the first mode position and the second mode position.

20. A mode changing mechanism according to claim 18, further comprising a chassis and in which the brake operating means includes at least one brake lever attached to one of the brake shoes and rotatably secured to the chassis to enable the attached brake shoe to come into contact with one of the supply or take-up reel bases, and urging means for urging the brake lever in a direction which presses the brake shoe against the one reel base.

21. A mode changing mechanism according to claim 20, in which the fourth regulatory drive means comprises a cam follower, which projects from a brake lever of the brake operating means, for following still another of the cam faces.

22. A mode changing mechanism according to claim 20, in which the brake operating means includes a plurality of brake levers, the fourth regulatory drive means also includes cam faces which are provided in the control means and separate cam followers which projects from brake levers of the brake operating means for following the cam faces in the control means, and the motion of the control means is regulated by the third regulatory means.

23. A mode changing mechanism for a tape cassette recording and/or reproducing apparatus of the type including rotary head drum means for recording information on and/or reproducing information from a magnetic tape, a capstan for driving the tape past the rotary head drum means, pinch-roller transferring means, including a rotatably supported pinch-roller, for pressing the pinch-roller against the capstan, a pair of reel bases capable of being engaged with a pair of tape reels which are accommodated in a tape cassette loaded into the tape cassette recorder and/or reproducing apparatus, and on which the magnetic tape is wound, tape loading means for drawing out the magnetic tape from the tape cassette and leading the tape to a predetermined tape path including the periphery of the rotary head drum means, wherein the tape loading means includes a chassis having guide ways formed therein, a pair of tape loading posts moveable along separate ones of the guide ways so as to lead the magnetic tape, a pair of pinions, each of which at least locally has a toothed portion and an engaged face, and a pair of link devices for moving the respective tape loading posts and separately connecting a different one of the tape loading posts to a different one of the pinions, a tape reel drive motor, reel base driving means for selectively imparting torque from the tape reel drive motor to either of the pair of reel bases, control means for controlling the action of the reel base driving means, and brake operating means for braking the pair of reel bases under predetermined conditions, wherein the mode changing mechanism comprises:

(a) mode changing means, including a mode changing slider moveable in parallel with a line passing through the centers of the pair of reel bases, integral first regulatory drive means for driving the tape loading means under a first set of predetermined conditions, second regulatory drive means for driving the pinch-roller transferring means under a second set of predetermined conditions, third regulatory drive means for driving the control means under a third set of predetermined conditions, and fourth regulatory drive means for driving the brake operating means under a fourth set of predetermined conditions; and (b) slider driving means for driving the mode changing slider in accordance with a selected one of a plurality of modes, each mode corresponding to a different combination of the first to fourth sets of predetermined conditions.

24. A mode changing mechanism according to claim 23, in which the first regulatory drive means comprises a rack engaged with the toothed portion of at least one of the pinions.

25. A mode changing mechanism according to claims 23 or 24, in which the first regulatory drive means comprises a engaging face which is engaged with the engaged face of at least one of the pinions so as to hold the tape loading post connected to it by one of the link devices in a post-loading mode position.

* * * * *